(12) United States Patent
Tanigawa et al.

(10) Patent No.: US 9,131,664 B2
(45) Date of Patent: Sep. 15, 2015

(54) EXCREMENT DETECTION SYSTEM, EXCREMENT DETECTION METHOD, AND NON-TRANSITORY COMPUTER READABLE RECORDING MEDIUM STORING PROGRAM THAT CONTROLS EXCREMENT DETECTION SYSTEM

(71) Applicant: Panasonic Intellectual Property Corporation of America, Torrance, CA (US)

(72) Inventors: Toru Tanigawa, Osaka (JP); Yoshihiro Kojima, Hyogo (JP); Ryuji Inoue, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/253,195

(22) Filed: Apr. 15, 2014

(65) Prior Publication Data
US 2014/0311415 A1    Oct. 23, 2014

(30) Foreign Application Priority Data
Apr. 16, 2013  (JP) ................................. 2013-085616

(51) Int. Cl.
*A01K 29/00*  (2006.01)
*A01K 15/02*  (2006.01)
*A01K 1/035*  (2006.01)
*A01K 1/01*   (2006.01)

(52) U.S. Cl.
CPC ............ *A01K 29/005* (2013.01); *A01K 1/0107* (2013.01); *A01K 1/035* (2013.01); *A01K 15/021* (2013.01)

(58) Field of Classification Search
CPC ...... A01K 15/02; A01K 1/035; A01K 15/021; A01K 1/0107; A01K 1/0114; A01K 1/0236; A01K 29/00; G05D 1/0088
USPC ................. 119/163, 174, 161, 712, 719, 720; 340/573.2
See application file for complete search history.

(56) References Cited

U.S. PATENT DOCUMENTS

| | | | |
|---|---|---|---|
| 6,860,239 B1 * | 3/2005 | Begun ........................... | 119/712 |
| 7,621,233 B2 * | 11/2009 | Dukes et al. .................. | 119/165 |
| 8,707,900 B1 * | 4/2014 | Womble ........................ | 119/51.5 |
| 2006/0011146 A1 * | 1/2006 | Kates ............................ | 119/719 |
| 2008/0072834 A1 * | 3/2008 | Makem ......................... | 119/169 |

FOREIGN PATENT DOCUMENTS

| | | |
|---|---|---|
| JP | 2007-241993 | 9/2007 |
| JP | 2009-153409 | 7/2009 |

* cited by examiner

*Primary Examiner* — Yvonne Abbott-Lewis
(74) *Attorney, Agent, or Firm* — Wenderoth, Lind & Ponack, L.L.P.

(57) ABSTRACT

An excrement detection system of this disclosure includes: an excretion information acquiring apparatus acquiring excretion information indicating whether a pet in a living space has performed excretion; a toilet observing apparatus observing inside of a pet toilet to acquire toilet information regarding inside of the pet toilet; an excretion information processing unit determining whether the pet has performed excretion based on the excretion information; a toilet information processing unit determining whether the pet is in the pet toilet based on the toilet information; an excretion position determining unit determining that the pet has performed excretion outside of the pet toilet when determined that the pet has performed excretion and that the pet is absent from the pet toilet; and a notifying unit notifying a pet's owner that the pet has performed excretion outside of the pet toilet when determined that the pet has performed excretion outside of the pet toilet.

9 Claims, 30 Drawing Sheets

FIG. 4

| OBSERVATION TIME | ODOR VALUE | EXCRETION PERFORMED OR NOT |
|---|---|---|
| 2012/09/02_12:00:01 | 53 | NOT PERFORMED |
| 2012/09/02_12:00:02 | 51 | NOT PERFORMED |
| 2012/09/02_12:00:03 | 53 | NOT PERFORMED |
| 2012/09/02_12:00:04 | 45 | NOT PERFORMED |
| 2012/09/02_12:00:05 | 54 | NOT PERFORMED |
| 2012/09/02_12:00:06 | 53 | NOT PERFORMED |
| 2012/09/02_12:00:07 | 78 | NOT PERFORMED |
| 2012/09/02_12:00:08 | 162 | NOT PERFORMED |
| 2012/09/02_12:00:09 | 487 | PERFORMED |
| 2012/09/02_12:00:10 | 468 | PERFORMED |
| 2012/09/02_12:00:11 | 480 | PERFORMED |
| 2012/09/02_12:00:12 | 471 | PERFORMED |
| 2012/09/02_12:00:13 | 472 | PERFORMED |
| 2012/09/02_12:00:14 | 483 | PERFORMED |
| ... | ... | ... |

FIG. 5

| OBSERVATION TIME | PRESENCE OR ABSENCE OF PET |
|---|---|
| 2012/09/02_12:00:01 | PRESENT |
| 2012/09/02_12:00:02 | PRESENT |
| 2012/09/02_12:00:03 | PRESENT |
| 2012/09/02_12:00:04 | ABSENT |
| 2012/09/02_12:00:05 | ABSENT |
| 2012/09/02_12:00:06 | ABSENT |
| 2012/09/02_12:00:07 | ABSENT |
| 2012/09/02_12:00:08 | ABSENT |
| 2012/09/02_12:00:09 | ABSENT |
| 2012/09/02_12:00:10 | ABSENT |
| 2012/09/02_12:00:11 | ABSENT |
| 2012/09/02_12:00:12 | ABSENT |
| 2012/09/02_12:00:13 | ABSENT |
| 2012/09/02_12:00:14 | ABSENT |
| ... | ... |

FIG. 10

| OBSERVATION TIME | PET POSITION (x, y) UNIT: cm |
|---|---|
| 2012/09/02_12:00:01 | (100, 100) |
| 2012/09/02_12:00:02 | (110, 150) |
| 2012/09/02_12:00:03 | (140, 220) |
| 2012/09/02_12:00:04 | (190, 340) |
| 2012/09/02_12:00:05 | (250, 450) |
| 2012/09/02_12:00:06 | (300, 500) |
| 2012/09/02_12:00:07 | (300, 500) |
| 2012/09/02_12:00:08 | (300, 500) |
| 2012/09/02_12:00:09 | (300, 500) |
| 2012/09/02_12:00:10 | (300, 500) |
| 2012/09/02_12:00:11 | (300, 500) |
| 2012/09/02_12:00:12 | (300, 500) |
| 2012/09/02_12:00:13 | (300, 500) |
| 2012/09/02_12:00:14 | (300, 500) |
| ... | ... |

| ODOR SOURCE | INSTALLATION POSITION (x, y) UNIT: cm |
|---|---|
| FOOD BOWL | (550, 50) |
| PET TOILET | (100, 100) |
| ... | ... |

FIG. 18

| OBSERVATION TIME | PET POSITION (x, y) UNIT: cm |
|---|---|
| 2012/09/02_12:00:01 | (550, 50) |
| 2012/09/02_12:00:02 | (540, 70) |
| 2012/09/02_12:00:03 | (430, 170) |
| 2012/09/02_12:00:04 | (340, 280) |
| 2012/09/02_12:00:05 | (320, 400) |
| 2012/09/02_12:00:06 | (300, 500) |
| 2012/09/02_12:00:07 | (300, 500) |
| 2012/09/02_12:00:08 | (300, 500) |
| 2012/09/02_12:00:09 | (300, 500) |
| 2012/09/02_12:00:10 | (300, 500) |
| 2012/09/02_12:00:11 | (300, 500) |
| 2012/09/02_12:00:12 | (300, 500) |
| 2012/09/02_12:00:13 | (300, 500) |
| 2012/09/02_12:00:14 | (300, 500) |
| ... | ... |

FIG. 19

| OBSERVATION TIME | ODOR VALUE | EXCRETION PERFORMED OR NOT |
|---|---|---|
| 2012/09/02_12:00:01 | 491 | NOT PERFORMED |
| 2012/09/02_12:00:02 | 389 | NOT PERFORMED |
| 2012/09/02_12:00:03 | 53 | NOT PERFORMED |
| 2012/09/02_12:00:04 | 45 | NOT PERFORMED |
| 2012/09/02_12:00:05 | 54 | NOT PERFORMED |
| 2012/09/02_12:00:06 | 53 | NOT PERFORMED |
| 2012/09/02_12:00:07 | 78 | NOT PERFORMED |
| 2012/09/02_12:00:08 | 162 | NOT PERFORMED |
| 2012/09/02_12:00:09 | 487 | PERFORMED |
| 2012/09/02_12:00:10 | 468 | PERFORMED |
| 2012/09/02_12:00:11 | 480 | PERFORMED |
| 2012/09/02_12:00:12 | 471 | PERFORMED |
| 2012/09/02_12:00:13 | 472 | PERFORMED |
| 2012/09/02_12:00:14 | 483 | PERFORMED |
| ... | ... | ... |

| OBSERVATION TIME | FEEDING PERFORMED OR NOT |
|---|---|
| ... | ... |
| 2012/09/02_10:43:01 | NOT PERFORMED |
| 2012/09/02_10:43:02 | NOT PERFORMED |
| 2012/09/02_10:43:03 | NOT PERFORMED |
| 2012/09/02_10:43:04 | NOT PERFORMED |
| 2012/09/02_10:43:05 | NOT PERFORMED |
| 2012/09/02_10:43:06 | NOT PERFORMED |
| 2012/09/02_10:43:07 | NOT PERFORMED |
| 2012/09/02_10:43:08 | NOT PERFORMED |
| 2012/09/02_10:43:09 | PERFORMED |
| 2012/09/02_10:43:10 | NOT PERFORMED |
| 2012/09/02_10:43:11 | NOT PERFORMED |
| 2012/09/02_10:43:12 | NOT PERFORMED |
| 2012/09/02_10:43:13 | NOT PERFORMED |
| 2012/09/02_10:43:14 | NOT PERFORMED |
| ... | ... |
| 2012/09/03_11:03:23 | NOT PERFORMED |
| 2012/09/03_11:03:24 | PERFORMED |
| 2012/09/03_11:03:25 | NOT PERFORMED |
| ... | ... |
| 2012/09/03_12:03:24 | NOT PERFORMED |

| OBSERVATION TIME | ODOR VALUE | EXCRETION PERFORMED OR NOT | EXCRETION POSITION (x, y) UNIT: cm |
|---|---|---|---|
| ... | ... | ... | ... |
| 2012/09/02_10:43:01 | 52 | NOT PERFORMED | — |
| ... | ... | ... | ... |
| 2012/09/02_12:00:01 | 491 | NOT PERFORMED | — |
| 2012/09/02_12:00:02 | 389 | NOT PERFORMED | — |
| 2012/09/02_12:00:03 | 53 | NOT PERFORMED | — |
| 2012/09/02_12:00:04 | 45 | NOT PERFORMED | — |
| 2012/09/02_12:00:05 | 54 | NOT PERFORMED | — |
| 2012/09/02_12:00:06 | 53 | NOT PERFORMED | — |
| 2012/09/02_12:00:07 | 78 | NOT PERFORMED | — |
| 2012/09/02_12:00:08 | 162 | NOT PERFORMED | — |
| 2012/09/02_12:00:09 | 487 | PERFORMED | (300,500) |
| 2012/09/02_12:00:10 | 468 | PERFORMED | (300,500) |
| 2012/09/02_12:00:11 | 480 | PERFORMED | (300,500) |
| 2012/09/02_12:00:12 | 471 | PERFORMED | (300,500) |
| 2012/09/02_12:00:13 | 472 | PERFORMED | (300,500) |
| 2012/09/02_12:00:14 | 483 | PERFORMED | (300,500) |
| ... | ... | ... | ... |
| 2012/09/03_12:03:22 | 55 | NOT PERFORMED | — |
| 2012/09/03_12:03:23 | 53 | NOT PERFORMED | — |
| 2012/09/03_12:03:24 | 54 | NOT PERFORMED | — |

FIG. 30

| OBSERVATION TIME | EXCRETION PERFORMED OR NOT | EXCRETION POSITION (x, y) UNIT: cm |
|---|---|---|
| ... | ... | ... |
| 2012/09/02_10:43:01 | NOT PERFORMED | — |
| ... | ... | ... |
| 2012/09/02_12:00:03 | NOT PERFORMED | — |
| 2012/09/02_12:00:04 | NOT PERFORMED | — |
| 2012/09/02_12:00:05 | NOT PERFORMED | — |
| 2012/09/02_12:00:06 | NOT PERFORMED | — |
| 2012/09/02_12:00:07 | NOT PERFORMED | — |
| 2012/09/02_12:00:08 | NOT PERFORMED | — |
| 2012/09/02_12:00:09 | PERFORMED | (300,500) |
| 2012/09/02_12:00:10 | PERFORMED | (300,500) |
| 2012/09/02_12:00:11 | PERFORMED | (300,500) |
| 2012/09/02_12:00:12 | PERFORMED | (300,500) |
| 2012/09/02_12:00:13 | PERFORMED | (300,500) |
| 2012/09/02_12:00:14 | PERFORMED | (300,500) |
| ... | ... | ... |
| 2012/09/03_18:00:50 | NOT PERFORMED | — |
| 2012/09/03_18:00:51 | PERFORMED | (100,100) |
| 2012/09/03_18:00:52 | PERFORMED | (100,100) |
| 2012/09/03_18:00:53 | PERFORMED | (100,100) |
| 2012/09/03_18:00:54 | PERFORMED | (100,100) |

EXCREMENT DETECTION SYSTEM, EXCREMENT DETECTION METHOD, AND NON-TRANSITORY COMPUTER READABLE RECORDING MEDIUM STORING PROGRAM THAT CONTROLS EXCREMENT DETECTION SYSTEM

TECHNICAL FIELD

The present disclosure relates to an excrement detection system, an excrement detection method, and a non-transitory computer readable recording medium storing a program that controls an excrement detection system which notify an owner of a pet that is kept indoors when excretion by the pet is not performed in a pet toilet.

BACKGROUND ART

Conventionally, as a method of detecting excrement of a pet, a technique is known for measuring an excretion frequency of the pet by detecting access by the pet to and from a pet toilet using a pet detecting unit provided near the pet toilet (refer to Japanese Patent Application Laid-open No. 2009-153409).

However, it is considered that the configuration of the prior art requires further improvements.

SUMMARY OF INVENTION

In order to solve the problem described above, an excrement detection system according to an aspect of the present disclosure includes: an excretion information acquiring apparatus that acquires excretion information indicating whether or not excretion has been performed by a pet present in a living space; a toilet observing apparatus that observes inside of a pet toilet installed in the living space to acquire toilet information regarding the inside of the pet toilet; an excretion information processing unit that determines whether or not the pet has performed excretion based on the excretion information; a toilet information processing unit that determines whether or not the pet is present in the pet toilet based on the toilet information; an excretion position determining unit that determines that the pet has performed excretion outside of the pet toilet when the excretion information processing unit determines that the pet has performed excretion and the toilet information processing unit determines that the pet is not present in the pet toilet; and a notifying unit that notifies an owner of the pet that the pet has performed excretion outside of the pet toilet when the excretion position determining unit determines that the pet has performed excretion outside of the pet toilet.

According to the aspect described above, further improvements can be achieved.

BRIEF DESCRIPTION OF DRAWINGS

FIG. 4 is a diagram showing an example of a determination history of an excretion information processing unit in the excrement detection system according to the first embodiment;

FIG. 5 is a diagram showing an example of a determination history of a toilet information processing unit in the excrement detection system according to the first embodiment;

FIG. 10 is a diagram showing an example of a determination history of a position information processing unit in the excrement detection system according to the second embodiment;

FIG. 17 is a diagram showing an example of a breeding environment database in the excrement detection system according to the fourth embodiment;

FIG. 18 is a diagram showing an example of a determination history of a position information processing unit in the excrement detection system according to the fourth embodiment;

FIG. 19 is a diagram showing an example of a determination history of an excretion information processing unit in the excrement detection system according to the fourth embodiment;

FIG. 28 is a diagram showing an example of a feeding history database in the excrement detection system according to the sixth embodiment;

FIG. 29 is a diagram showing an example of an excretion history database in the excrement detection system according to the sixth embodiment; and FIG. 30 is a diagram showing another example of an excretion history database in the excrement detection system according to the sixth embodiment.

DESCRIPTION OF EMBODIMENTS

Figure 1:
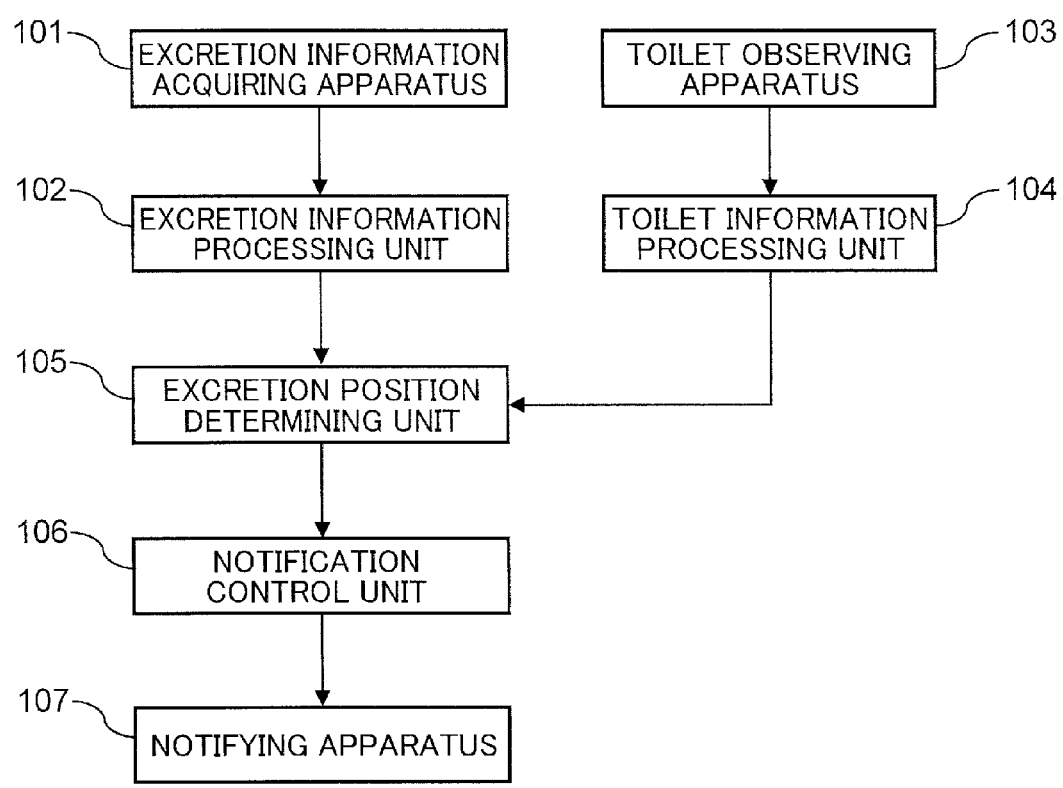
FIG. 1 is a block diagram showing a configuration of an excrement detection system according to a first embodiment.

Circumstances Leading to the Invention of an Aspect of the Present Disclosure

First, viewpoints of an aspect according to the present disclosure will be described.

When a pet is not thoroughly trained, the pet may perform excretion at places other than a pet toilet installed in a living space. Furthermore, even if a pet has been trained, when the pet toilet is in a dirty state because the pet toilet had not been cleaned or the like, the pet may perform excretion at places other than the pet toilet. As described above, when excretion is performed by the pet at places other than the pet toilet, the technique according to the above Patent Document 1 is incapable of detecting excretion or excrement of the pet.

Based on the considerations described above, the present inventors has arrived at an invention including the respective aspects according to the present disclosure as presented below. An object of an aspect of the present disclosure is to provide an excrement detection system, an excrement detection method, and an excrement detecting program which determine whether or not excretion by a pet kept indoors is performed in a pet toilet installed at a predetermined position and which notify an owner of the pet when it is determined that excretion by the pet is not performed in the pet toilet.

Hereinafter, before providing a detailed description of an embodiment according to an aspect of the present disclosure with reference to the drawings, various aspects of the present disclosure will be described.

An aspect of the present disclosure includes: an excretion information acquiring apparatus that acquires excretion information indicating whether or not excretion has been performed by a pet present in a living space; a toilet observing apparatus that observes inside of a pet toilet installed in the living space to acquire toilet information regarding the inside of the pet toilet; an excretion information processing unit that determines whether or not the pet has performed excretion based on the excretion information; a toilet information processing unit that determines whether or not the pet is present in the pet toilet based on the toilet information; an excretion position determining unit that determines that the pet has performed excretion outside of the pet toilet when the excretion information processing unit determines that the pet has performed excretion and the toilet information processing unit determines that the pet is not present in the pet toilet; and a notifying unit that notifies an owner of the pet that the pet has performed excretion outside of the pet toilet when the excretion position determining unit determines that the pet has performed excretion outside of the pet toilet.

According to the present aspect, an excretion information processing unit determines that a pet has performed excretion. A toilet information processing unit determines that the pet is not present in a pet toilet. As a result, an excretion position determining unit can determine that the pet has performed excretion outside of the pet toilet. When the excretion position determining unit determines that the pet has performed excretion outside of the pet toilet, a notifying unit notifies an owner of the pet. As a result, even when the pet performs excretion outside of the pet toilet, the owner of the pet can reduce adherence of the odor of excrement by treating the excrement outside of the pet toilet.

The aspect described above may further include, for example, a pet observing apparatus that observes the pet to acquire pet information indicating a position of the pet and a position information processing unit that determines a position of the pet in the living space based on the pet information. When the excretion position determining unit determines that the pet has performed excretion outside of the pet toilet, the notifying unit may notify the owner of a position at which the pet has performed excretion based on the position of the pet as determined by the position information processing unit.

According to the present aspect, a position information processing unit determines a position of a pet. Consequently, a position at which the pet has performed excretion outside of the pet toilet can be notified to an owner. As a result, the owner of the pet can pet can reduce adherence of the odor of excrement by immediately treating the excrement outside of the pet toilet.

The aspect described above may further include, for example, a position management database for recording history of a position of the pet. The position information processing unit may record the determined position of the pet as history of the position of the pet in the position management database. The excretion information processing unit may determine whether or not the pet has performed excretion based on the history of the position of the pet that is recorded in the position management database and on the excretion information.

According to the present aspect, the excretion information processing unit determines that a pet is moving based on history of the position of the pet that is recorded in the position management database. Consequently, since the pet is moving, the excretion information processing unit can determine that the pet is not performing excretion. As a result, even in a case where the excretion information acquiring apparatus erroneously detects a foreign object that is not excrement to be excrement when the pet is moving, an erroneous notification can be prevented from being issued to the owner of the pet.

The aspect described above may further include, for example, a breeding environment database in which a position of an odor source in the living space is recorded. The excretion information acquiring apparatus may include an odor sensor which is mounted to the pet and which detects an odor component around the pet. The excretion information processing unit may determine that the pet has performed excretion when the odor sensor detects an odor component that differs from an odor component in the living space in a normal state that is free of excrement and, at the same time, when a position of the pet as determined by the position information processing unit is a position other than the position of the odor source that is recorded in the breeding environment database.

According to the present aspect, even when the odor sensor detects an odor component of a foreign substance, if a position of the pet is near the position of an odor source that is recorded in the breeding environment database, the excretion information processing unit determines that the pet has not performed excretion. As a result, an erroneous notification can be prevented from being issued to the owner of the pet.

The aspect described above may further include, for example, an excretion history database for recording a position at which the pet had performed excretion outside of the pet toilet and an excretion predicting unit that predicts that the pet may possibly perform excretion outside of the pet toilet when the position of the pet as determined by the position information processing unit is a position that is near a position at which the pet had performed excretion outside of the pet toilet and which is recorded in the excretion history database. When determining that the pet has performed excretion outside of the pet toilet, the excretion position determining unit may record a position of the pet as determined by the position information processing unit in the excretion history database. When the excretion predicting unit predicts that the pet may possibly perform excretion outside of the pet toilet, the notifying unit may notify the owner that the pet may possibly perform excretion outside of the pet toilet.

According to the present aspect, when the pet approaches a position at which the pet had previously performed excretion outside of the pet toilet, the excretion predicting unit predicts that the pet may possibly perform excretion outside of the pet toilet. Based on the prediction, the notifying unit notifies the owner of the pet that the pet may possibly perform excretion. Accordingly, the owner can prevent the pet from performing excretion outside of the pet toilet.

In the aspect described above, for example, when the excretion information processing unit determines that the pet has performed excretion, the excretion position determining unit may further record an excretion time at which the pet had performed excretion in the excretion history database. The excretion predicting unit may calculate an excretion cycle of the pet based on the excretion time that is recorded in the excretion history database to predict a next excretion time of the pet based on the calculated excretion cycle. The excretion predicting unit may predict that the pet may possibly perform excretion outside of the pet toilet when the position of the pet as determined by the position information processing unit is a position that is near a position at which the pet had performed excretion outside of the pet toilet and which is recorded in the excretion history database and, at the same time, when the predicted next excretion time of the pet approaches.

According to the present aspect, the excretion predicting unit predicts a next excretion time of a pet based on excretion history of the pet. The excretion predicting unit further uses the prediction to predict that the pet may possibly perform excretion outside of the pet toilet. Based on the prediction, the notifying unit notifies the owner of the pet that the pet may possibly perform excretion outside of the pet toilet. Accordingly, the owner can prevent the pet from performing excretion outside of the pet toilet.

The aspect described above may further include, for example, a feeding place observing apparatus that observes a feeding place of the pet in the living space to acquire feeding place information that indicates presence or absence of food at the feeding place, a feeding history database for recording information related to food of the pet, and a feeding place information processing unit that determines whether or not the pet has eaten food based on the feeding place information and records a result of the determination and a feeding time at which the pet has eaten food in the feeding history database.

The excretion predicting unit may calculate an elapsed time that is required from feeding to performing excretion of the pet based on the feeding time that is recorded in the feeding history database and the excretion time of the pet that is recorded in the excretion history database, to predict a next excretion time of the pet based on the calculated elapsed time. The excretion predicting unit may predict that the pet may possibly perform excretion outside of the pet toilet when the position of the pet as determined by the position information processing unit is a position that is near a position at which the pet had performed excretion outside of the pet toilet and which is recorded in the excretion history database and, at the same time, when the predicted next excretion time of the pet approaches.

According to the present aspect, the excretion predicting unit predicts a next excretion time of a pet based on feeding history and excretion history of the pet. The excretion predicting unit further uses the prediction to predict that the pet may possibly perform excretion outside of the pet toilet. Based on the prediction, the notifying unit notifies the owner of the pet that the pet may possibly perform excretion outside of the pet toilet. Accordingly, the owner can prevent the pet from performing excretion outside of the pet toilet.

Another aspect according to the present disclosure is an excrement detection method of an excrement detection system that detects whether or not excretion has been performed by a pet, the excrement detection method including: acquiring excretion information indicating whether or not excretion has been performed by the pet present in a living space; observing inside of a pet toilet installed in the living space to acquire toilet information regarding the inside of the pet toilet; determining whether or not the pet has performed excretion based on the excretion information; determining whether or not the pet is present in the pet toilet based on the toilet information; determining that the pet has performed excretion outside of the pet toilet when it is determined that the pet has performed excretion and that the pet is not present in the pet toilet; and notifying an owner of the pet that the pet has performed excretion outside of the pet toilet when it is determined that the pet has performed excretion outside of the pet toilet.

Yet another aspect according to the present disclosure is a program that controls an excrement detection system that detects whether or not excretion has been performed by a pet, the program causing a computer of the excrement detection system to: acquire excretion information indicating whether or not excretion has been performed by the pet present in a living space; observe inside of a pet toilet installed in the living space to acquire toilet information regarding the inside of the pet toilet; determine whether or not the pet has performed excretion based on the excretion information; determine whether or not the pet is present in the pet toilet based on the toilet information; determine that the pet has performed excretion outside of the pet toilet when it is determined that the pet has performed excretion and that the pet is not present in the pet toilet; and notify an owner of the pet that the pet has performed excretion outside of the pet toilet when it is determined that the pet has performed excretion outside of the pet toilet.

These aspects in general or the specific aspects described above may be realized by a system, a method, a computer program, a recording medium, or any combination of the system, the method, the computer program, and the recording medium.

Hereinafter, embodiments will be described with reference to the drawings.

First Embodiment

Description of Basic Configuration of Excrement Detection System

FIG. 1 is a block diagram showing a configuration of an excrement detection system according to a first embodiment. The excrement detection system according to the first embodiment includes an excretion information acquiring apparatus 101, an excretion information processing unit 102, a toilet observing apparatus 103, a toilet information processing unit 104, an excretion position determining unit 105, a notification control unit 106, and a notifying apparatus 107. In this case, excrement refers to feces, urine, or vomit that is expelled from the body of a pet.

Description of Excretion Information Acquiring Apparatus 101

The excretion information acquiring apparatus 101 is installed in a living space of a pet and acquires excretion information that indicates whether or not the pet has performed excretion. For example, an odor sensor, a heat sensor, or an image sensor may be used as the excretion information acquiring apparatus 101.

The odor sensor may be used as the excretion information acquiring apparatus 101. The odor sensor detects concentration of an odor component contained in air. In this case, for example, the odor sensor may be mounted to the neck of the pet. According to this configuration, the odor sensor can acquire an odor around the pet.

The heat sensor may be used as the excretion information acquiring apparatus 101. The heat sensor is a contactless temperature sensor and includes a thermopile, a bolometer, and a pyroelectric sensor. In this case, for example, the heat sensor may be mounted to an ankle of a hind leg of the pet so as to face the rear. According to this configuration, the heat sensor can acquire a temperature of excreta of the pet. Alternatively, the heat sensor may be mounted to an ankle of a front leg of the pet so as to face the front. According to this configuration, the heat sensor can acquire a temperature of vomit of the pet.

The image sensor may be used as the excretion information acquiring apparatus 101. The image sensor acquires an image of an object. In this case, for example, the image sensor may be mounted to an ankle of a hind leg of the pet so as to face the rear. According to this configuration, the image sensor can acquire an image of excreta located to the rear of the pet. Alternatively, the image sensor can be mounted to an ankle of a front leg of the pet so as to face the front. According to this configuration, the image sensor can acquire an image of vomit of the pet.

Description of Excretion Information Processing Unit 102

The excretion information processing unit 102 determines whether or not the pet has performed excretion based on the excretion information acquired by the excretion information acquiring apparatus 101.

When the excretion information acquiring apparatus 101 includes the odor sensor, the excretion information processing unit 102 quantifies concentration of the odor component acquired by the odor sensor. When the quantified value exceeds a predetermined threshold, the excretion information processing unit 102 determines that the pet has performed excretion. In this case, quantifying concentration of the odor component refers to converting the concentration of an odor component contained in air into a numerical value. In addition, an odor component refers to, for example, ammonia or hydrogen sulfide.

For example, in FIG. 4 (to be described later), an odor value that is a quantified concentration of an odor component is a two or three-digit numerical value. For example, in FIG. 4, the predetermined threshold is 200. Moreover, the present embodiment is not limited to quantifying concentration of an odor component. For example, concentration of an odor component expressed in units of ppm may be used as is.

In a case where the excretion information acquiring apparatus 101 includes the heat sensor, the excretion information processing unit 102 determines that the pet has performed excretion when a temperature acquired by the heat sensor is a temperature within a predetermined range. The predetermined temperature range may be set to a normal body temperature range of the pet. For example, when the pet is a large dog, the predetermined temperature range may be set to a range from 37° C. to 39° C. Moreover, a temperature of excrement gradually declines after excretion by the pet. Therefore, the predetermined temperature range may be set to 35° C. to 39° C. by setting a lower limit of the range to be lower than the normal body temperature.

When the excretion information acquiring apparatus 101 includes the image sensor, the excretion information processing unit 102 determines whether or not the pet has performed excretion by processing an image acquired by the image sensor. As an image processing method, for example, a background difference method or an image processing method using a histogram matching method may be used.

With this method, first, the excretion information processing unit 102 acquires, in advance, an image of the floor as a background image. It is assumed that the floor is monochromatic and that a difference is not created in the background image as long as there are no objects on the floor even when the pet moves. In addition, the excretion information processing unit 102 prepares, in advance, a color histogram as a template of excrement (in case of feces, a brown component increases). Next, the excretion information processing unit 102 extracts a difference area between an image captured by the image sensor and the background image.

Subsequently, the excretion information processing unit 102 performs histogram matching of the difference area and the template. Based on a result of the histogram matching, the excretion information processing unit 102 determines whether or not an object portrayed in the difference area is excrement. When the excretion information processing unit 102 determines that a difference between the difference area and the template is equal to or lower than a predetermined threshold as a result of the histogram matching, the excretion information processing unit 102 determines that the object portrayed in the difference area is excrement.

Moreover, the excretion information acquiring apparatus 101 and the excretion information processing unit 102 are not limited to the above and need only be capable of determining whether or not the pet has performed excretion.

The following description will be based on an example which uses the odor sensor mounted to the pet as the excretion information acquiring apparatus 101.

Description of Toilet Observing Apparatus 103

The toilet observing apparatus 103 is installed in a living space of the pet and observes inside of a pet toilet. The toilet observing apparatus 103 acquires toilet information that indicates whether or not the pet is present in the pet toilet. For example, an odor sensor, a pyroelectric sensor, or an image sensor may be used as the toilet observing apparatus 103.

The odor sensor may be used as the toilet observing apparatus 103. In this case, for example, the odor sensor may be installed in the pet toilet as the toilet observing apparatus 103. According to this configuration, the toilet observing apparatus 103 can acquire concentration of an odor component in the pet toilet as the toilet information.

The pyroelectric sensor may be used as the toilet observing apparatus 103. In this case, the toilet observing apparatus 103 can acquire infrared rays emitted from a heat source inside the pet toilet as the toilet information.

The image sensor may be used as the toilet observing apparatus 103. In this case, the toilet observing apparatus 103 can acquire an image of the inside of the pet toilet as the toilet information.

Description of Toilet Information Processing Unit 104

Based on the toilet information acquired by the toilet observing apparatus 103, the toilet information processing unit 104 determines whether or not the pet is present in the pet toilet.

When the odor sensor is used as the toilet observing apparatus 103, the toilet information processing unit 104 determines a pet odor. Accordingly, the toilet information processing unit 104 determines whether or not the pet is present in the pet toilet. Moreover, a description of a method of determining the pet odor is similar to contents provided with respect to an odor sensor in the description of the excretion information acquiring apparatus 101 or the excretion information processing unit 102. Therefore, a detailed description will be omitted.

Moreover, the same odor sensor as that used as the excretion information acquiring apparatus 101 may be used as the toilet observing apparatus 103. Even in this case, the toilet information processing unit 104 can determine whether or not the pet is present in the pet toilet. Alternatively, an odor sensor which differs from that used as the excretion information acquiring apparatus 101 may be used as the toilet observing apparatus 103. For example, an odor sensor that is capable of detecting a pet odor (an odor component emitted by the body of the pot) may be used as the toilet observing apparatus 103.

When the pyroelectric sensor is used as the toilet observing apparatus 103, the pyroelectric sensor is capable of detecting a change in temperature. Therefore, when a temperature change occurs in the pet toilet, the toilet information processing unit 104 can determine that the pet is present in the pet toilet.

When the image sensor is used as the toilet observing apparatus 103, the toilet information processing unit 104 determines whether or not the pet is present in the pet toilet based on an image acquired by the image sensor. Moreover, a description of a method of determining whether or not the pet is present in the pet toilet is similar to contents provided with respect to an image sensor in the description of the excretion information acquiring apparatus 101 or the excretion information processing unit 102. Therefore, a detailed description will be omitted.

Moreover, the toilet observing apparatus 103 and the toilet information processing unit 104 are not limited to the above and need only be capable of determining whether or not the pet is present in the pet toilet.

The following description will be based on an example which uses the image sensor as the toilet observing apparatus 103.

Description of Excretion Position Determining Unit 105

The excretion position determining unit 105 determines whether or not excretion by the pet has been performed outside of the pet toilet. When the toilet information processing unit 104 determines that the pet is not present in the pet toilet at the time when the excretion information processing unit 102 had determined that the pet had performed excretion, the excretion position determining unit 105 determines that the pet has performed excretion outside of the pet toilet.

Description of Notification Control Unit 106

The notification control unit 106 controls the notifying apparatus 107 (to be described later) based on a determination result of the excretion position determining unit 105.

Description of Notifying Apparatus 107

Based on a control command from the notification control unit 106, the notifying apparatus 107 performs notification of a determination result of the excretion position determining unit 105 to the owner of the pet.

For example, a mobile terminal owned by the pet owner can be used as the notifying apparatus 107. In the present embodiment, the notification control unit 106 and the notifying apparatus 107 constitute an example of the notifying unit.

Figure 3A:
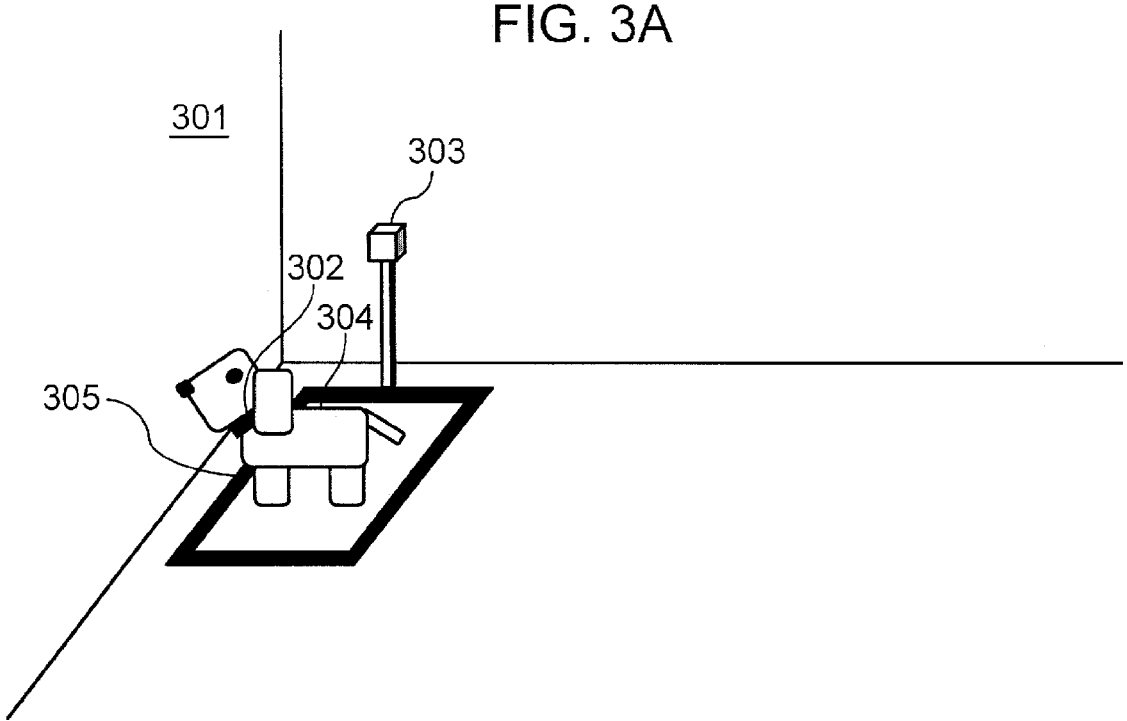
FIG. 3A is a diagram showing an example of a living space in the excrement detection system according to the first embodiment.
Figure 3B:
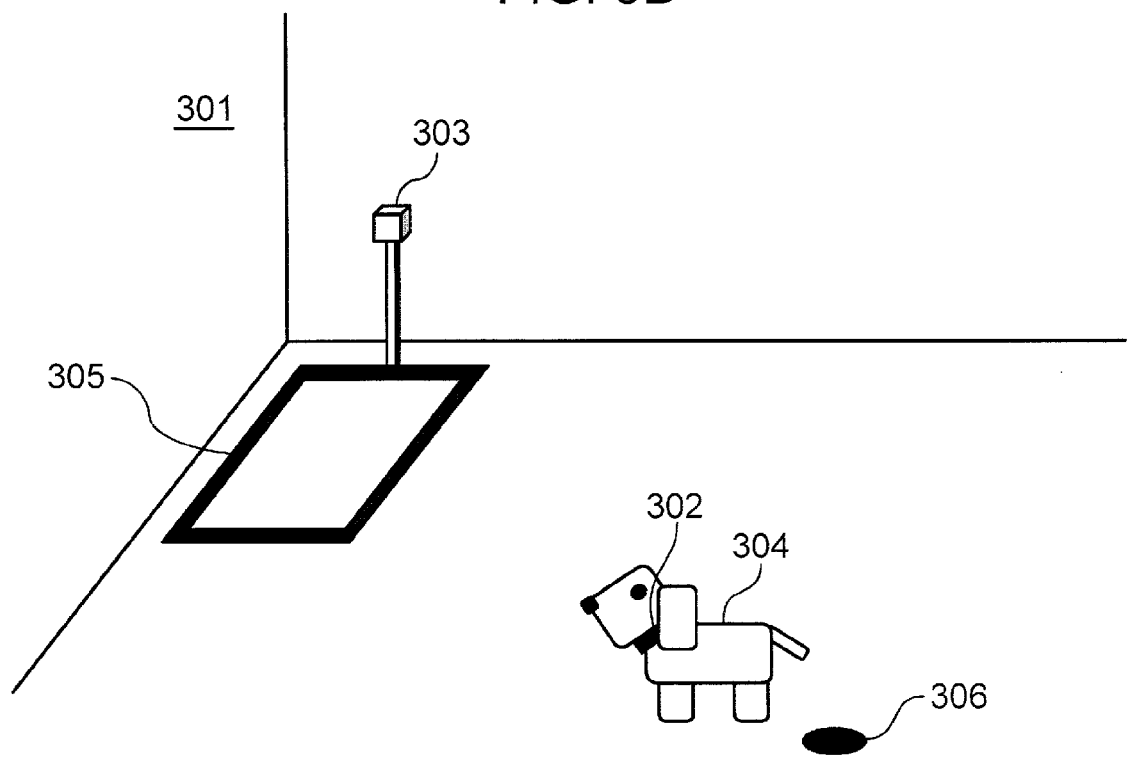
FIG. 3B is a diagram showing an example of a living space in the excrement detection system according to the first embodiment.

FIGS. 3A and 3B are diagrams showing a breeding environment 301 as an example of a living space of a pet to which the excrement detection system has been introduced. A pet toilet 305 and a dog 304 are present in the breeding environment 301 shown in FIG. 3A. An image sensor 303 as an example of the toilet observing apparatus 103 is installed in the pet toilet 305. An odor sensor 302 as an example of the excretion information acquiring apparatus 101 is mounted to the dog 304. In FIG. 3A, the dog 304 is positioned inside the pet toilet 305. In FIG. 3B, the dog 304 is positioned outside the pet toilet 305. Furthermore, feces 306 excreted by the dog 304 outside of the pet toilet 305 are further present in the breeding environment 301 shown in FIG. 3B.

Description of Flow Chart

Figure 2:
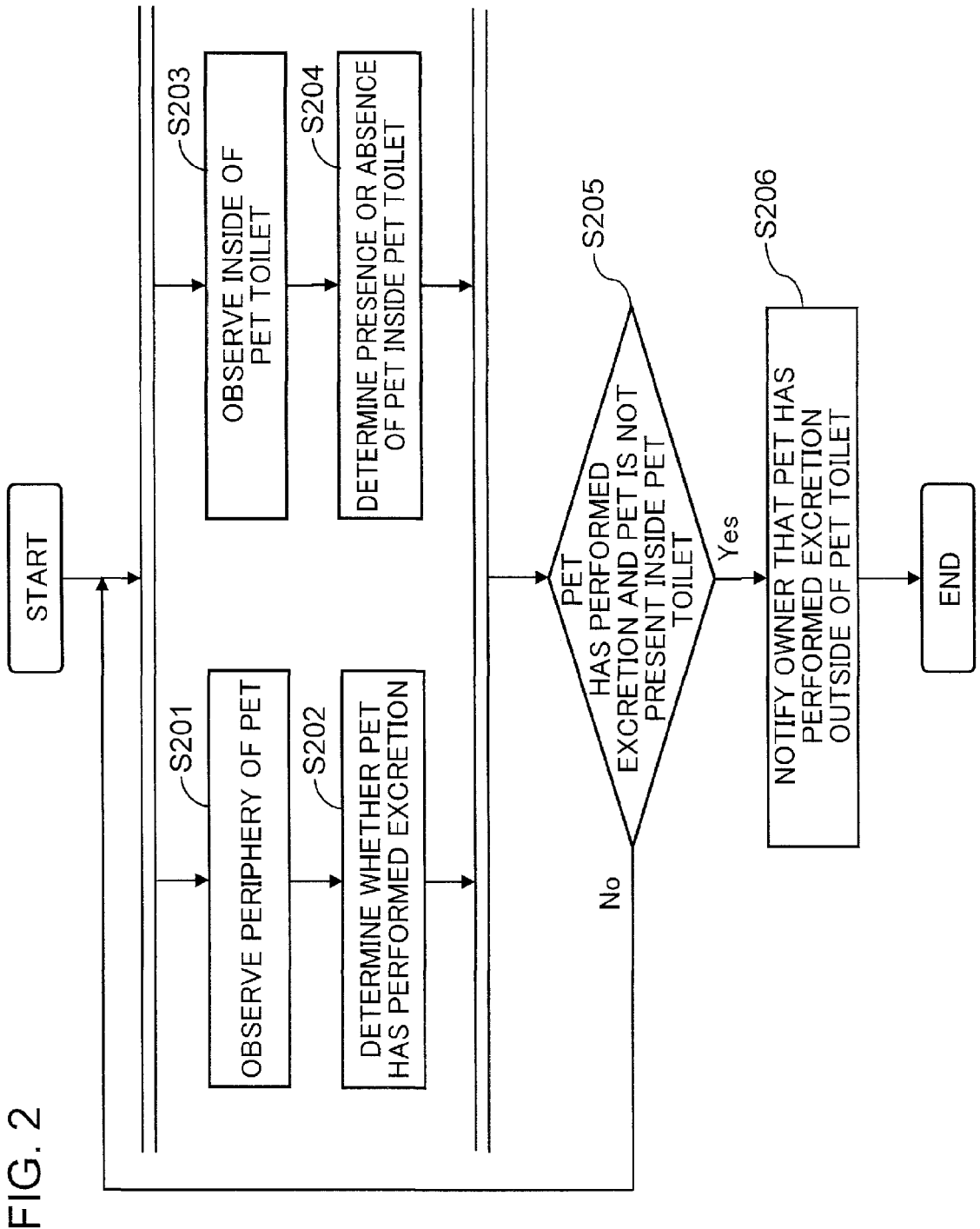
FIG. 2 is a flow chart showing overall processing by the excrement detection system according to the first embodiment.

FIG. 2 is a flow chart representing overall processing of the excrement detection system according to the first embodiment. Hereinafter, operations of the respective components will be described in correspondence with the flow chart shown in FIG. 2.

In step S201, the odor sensor 302 as the excretion information acquiring apparatus 101 acquires odor information (concentration of an odor component) around the dog 304 that is an observation range of the odor sensor 302 as excretion information at a predetermined observation cycle (for example, 1 second).

In step S202, the excretion information processing unit 102 determines whether or not excrement is present around the dog 304 based on the odor information (excretion information) acquired by the odor sensor 302.

FIG. 4 is a diagram showing an example of a determination history of the excretion information processing unit 102. In the example shown in FIG. 4, the excretion information processing unit 102 determines that the dog 304 had performed excretion at 12:00:09 on Sep. 2, 2012.

In step S203, the image sensor 303 as the toilet observing apparatus 103 acquires an image inside the pet toilet 305 that is an observation range of the image sensor 303 as toilet information at a predetermined observation cycle (for example, 1 second).

In step S204, the toilet information processing unit 104 determines whether or not the dog 304 is present in the pet toilet 305 based on the image (toilet information) acquired by the image sensor 303.

FIG. 5 is a diagram showing an example of a determination history of the toilet information processing unit 104. In the example shown in FIG. 5, the toilet information processing unit 104 determines that the dog 304 is present in the pet toilet 305 from 12:00:01 to 12:00:03 on Sep. 2, 2012. On the other hand, the toilet information processing unit 104 determines that the dog 304 is not present in the pet toilet 305 from 12:00:04.

In step S205, the excretion position determining unit 105 determines whether or not the dog 304 has performed excretion outside of the pet toilet 305. When the excretion information processing unit 102 determines that excrement is present around the dog 304 and, at the same time, the toilet information processing unit 104 determines that the dog 304 is not present in the pet toilet 305 (Yes in S205), the excretion position determining unit 105 determines that the dog 304 has performed excretion outside of the pet toilet 305 and the processing advances to step S206. In case of a determination of No in S205, the processing advances to step S201 and then to step S203.

In the example shown in FIGS. 4 and 5, in step S205, excrement is not determined to be present around the dog 304 and the dog 304 is determined to be present in the pet toilet 305 from 12:00:01 to 12:00:03 on Sep. 2, 2012. Therefore, the processing advances to step S201 and then to step S202.

In step S205, the dog 304 is determined not to be present in the pet toilet 305 but excrement is determined not to be present around the dog 304 from 12:00:04 to 12:00:08 on Sep. 2, 2012. Therefore, the processing advances to step S201 and then to step S202.

In step S205, the dog 304 is determined not to be present in the pet toilet 305 and excrement is determined to be present around the dog 304 at 12:00:09 on Sep. 2, 2012. Therefore, the processing advances to step S206.

In step S206, the notification control unit 106 controls the notifying apparatus 107 and causes the notifying apparatus 107 to notify the owner of the dog 304 that the dog 304 has performed excretion outside of the pet toilet 305.

Figure 6:
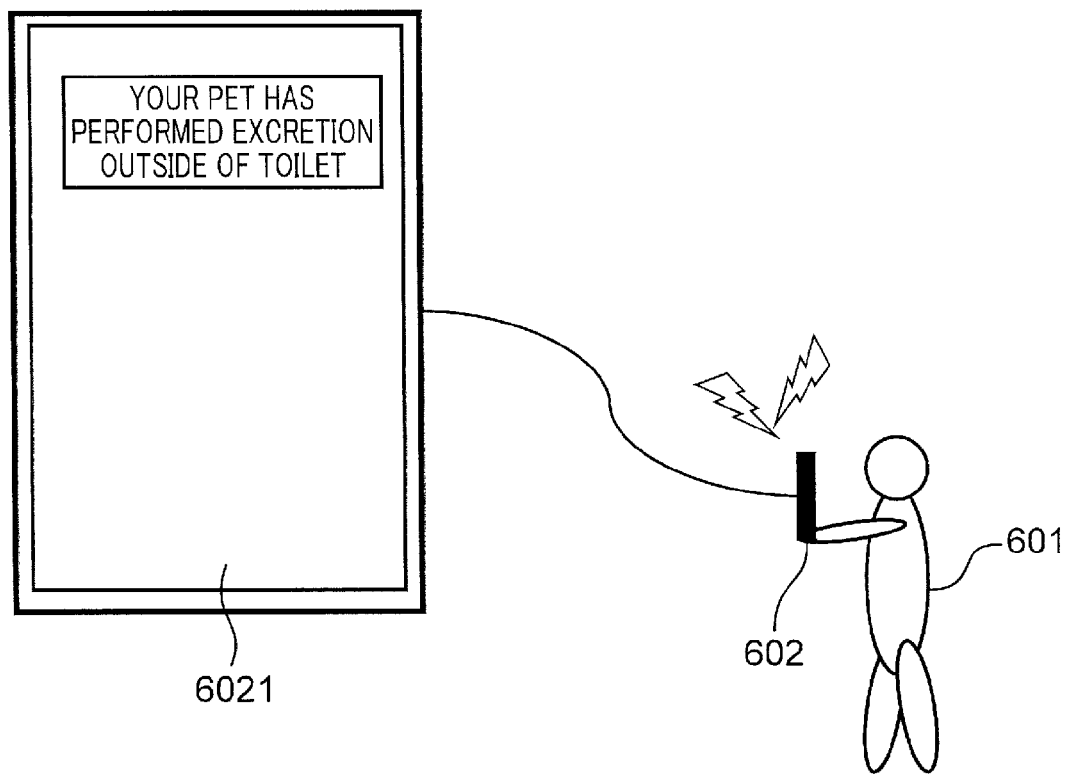
FIG. 6 is a diagram showing an example of a notifying method in the excrement detection system according to the first embodiment.

FIG. 6 is a diagram showing an example of a mobile terminal 602 as an example of the notifying apparatus 107. In FIG. 6, the notification control unit 106 causes a display unit 6021 of the mobile terminal 602 to display a text reading "Your pet has performed excretion outside of the toilet". Due to the display, an owner 601 of the dog 304 is notified by text that the dog 304 has performed excretion outside of the pet toilet 305.

In FIG. 2, steps S201 and S202 are repetitively executed at a predetermined observation cycle by the excretion information acquiring apparatus 101 and the excretion information processing unit 102. Steps S203 and S204 are repetitively executed at a predetermined observation cycle by the toilet observing apparatus 103 and the toilet information processing unit 104. Step S205 is repetitively executed at a predetermined cycle (for example, 1 second) by the excretion position determining unit 105.

As described above, in the first embodiment, when the excretion information processing unit 102 determines that a pet has performed excretion and, at the same time, the toilet information processing unit 104 determines that the pet is not present in a pet toilet, the excretion position determining unit 105 determines that the pet has performed excretion outside of the pet toilet. In addition, when the excretion position determining unit 105 determines that the pet has performed excretion outside of the pet toilet, the owner of the pet is notified to this effect by the notification control unit 106 through the notifying apparatus 107. Therefore, according to the first embodiment, the owner of the pet can immediately learn that the pet has performed excretion outside of the pet toilet. As a result, even when the pet performs excretion outside of the pet toilet, the owner of the pet can reduce adherence of the odor of excrement by treating the excrement outside of the pet toilet.

Second Embodiment

In a second embodiment, a position of a pet is detected and a position at which the pet has performed excretion outside of the pet toilet is notified to the owner.

Figure 7:
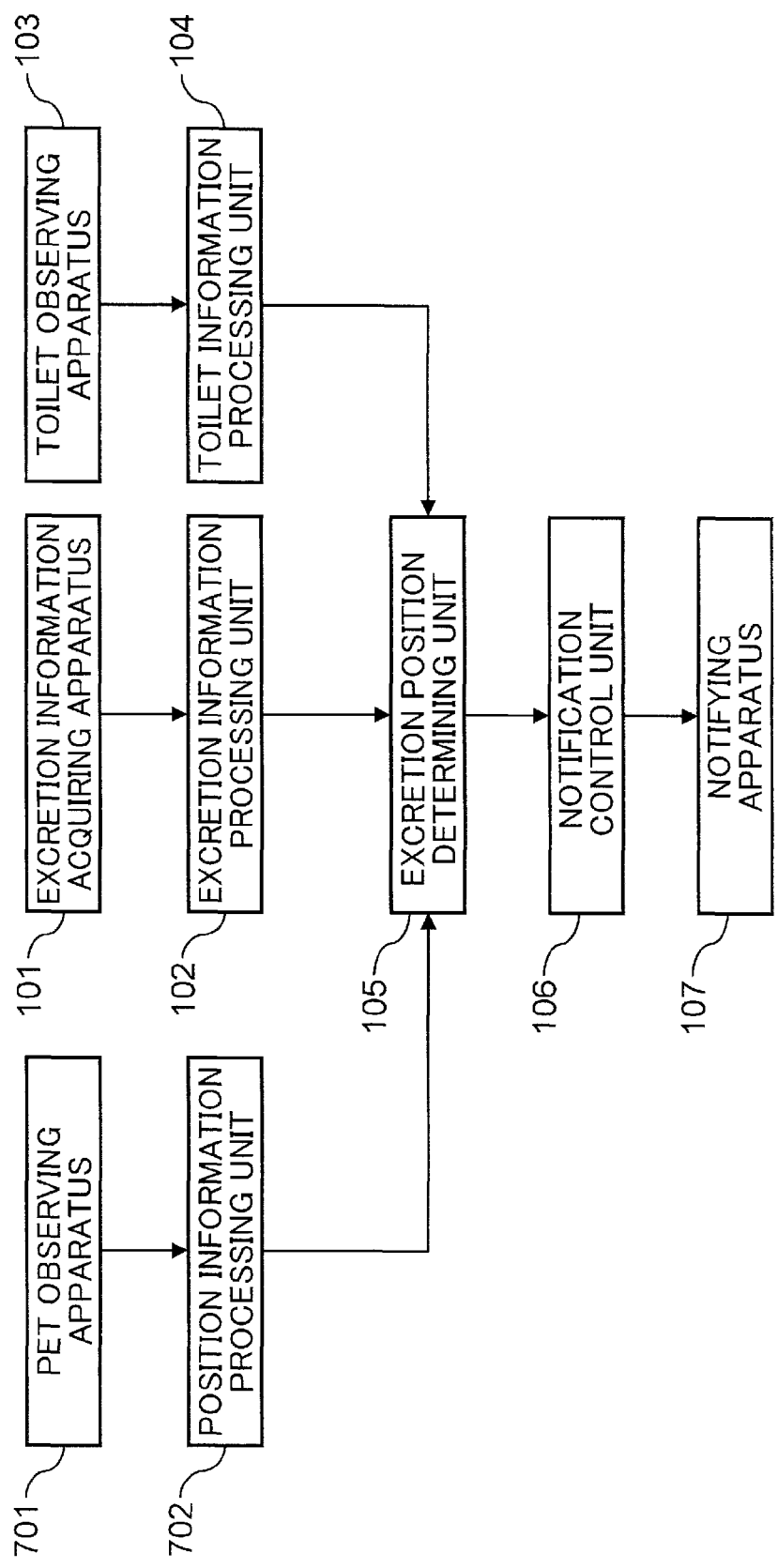
FIG. 7 is a block diagram showing a configuration of an excrement detection system according to a second embodiment.

FIG. 7 is a block diagram showing a configuration of an excrement detection system according to the second embodiment.

The excrement detection system according to the second embodiment includes an excretion information acquiring apparatus 101, an excretion information processing unit 102, a toilet observing apparatus 103, a toilet information processing unit 104, an excretion position determining unit 105, a notification control unit 106, a notifying apparatus 107, a pet observing apparatus 701, and a position information processing unit 702.

The respective components other than the pet observing apparatus 701 and the position information processing unit 702 are similar to the contents described in the first embodiment. Therefore, a detailed description thereof will be omitted.

Description of Pet Observing Apparatus 701

The pet observing apparatus 701 is arranged in a living space of a pet. The pet observing apparatus 701 acquires pet information that indicates a position of the pet inside the living space. For example, a radio tag system or an image sensor can be used as the pet observing apparatus 701.

Description of Position Information Processing Unit 702

The position information processing unit 702 calculates a position of the pet in the living space based on the pet information acquired by the pet observing apparatus 701.

A radio tag system may be used as the pet observing apparatus 701. In this case, for example, the position information processing unit 702 calculates a position of the pet by trilateration. First, a radio tag is mounted to a collar of the pet or the like. In addition, at least three or more antennas for the radio tag are arranged in the living space.

A distance from each antenna to the radio tag can be obtained from a time difference between an inquiry wave outputted by the antenna and a returning response wave outputted by the radio tag. When positions where the respective antennas are arranged are known, the position information processing unit 702 can calculate a position of the radio tag using trilateration based on the distances between the respective antennas and the radio tag. Moreover, it is assumed that the positions of the respective antennas in the living space are recorded in an internal storage of the radio tag system.

An image sensor may be used as the pet observing apparatus 701. In this case, for example, the position information processing unit 702 can estimate a position of a mobile body (pet) using a background difference method. A background image of the living space when the mobile body is not present therein is acquired in advance by the image sensor, and the acquired background image of the living space is stored in advance by the position information processing unit 702. The position information processing unit 702 compares the background image of the living space when the mobile body is not present therein with a current image acquired by the image sensor.

Subsequently, the position information processing unit 702 extracts an area with a different pixel value as a difference area. However, the image may contain noise. Therefore, when the difference area can be determined to be sufficiently small with respect to the pet, the difference area may be determined not to be the pet. In this case, the difference area being sufficiently small with respect to the pet may be defined as the number of pixels of the difference area being equal to or smaller than a threshold set in advance based on the minimum number of pixels that enables recognition as the mobile body (pet).

Moreover, for example, the position information processing unit 702 may assume the detected position of the pet to be a center of gravity position of the difference area. In addition, it is assumed that a position of the image sensor in the living space and a correspondence between a pixel at the center of gravity position and a position in the living space are recorded in advance in an internal storage of the image sensor.

Figure 9:
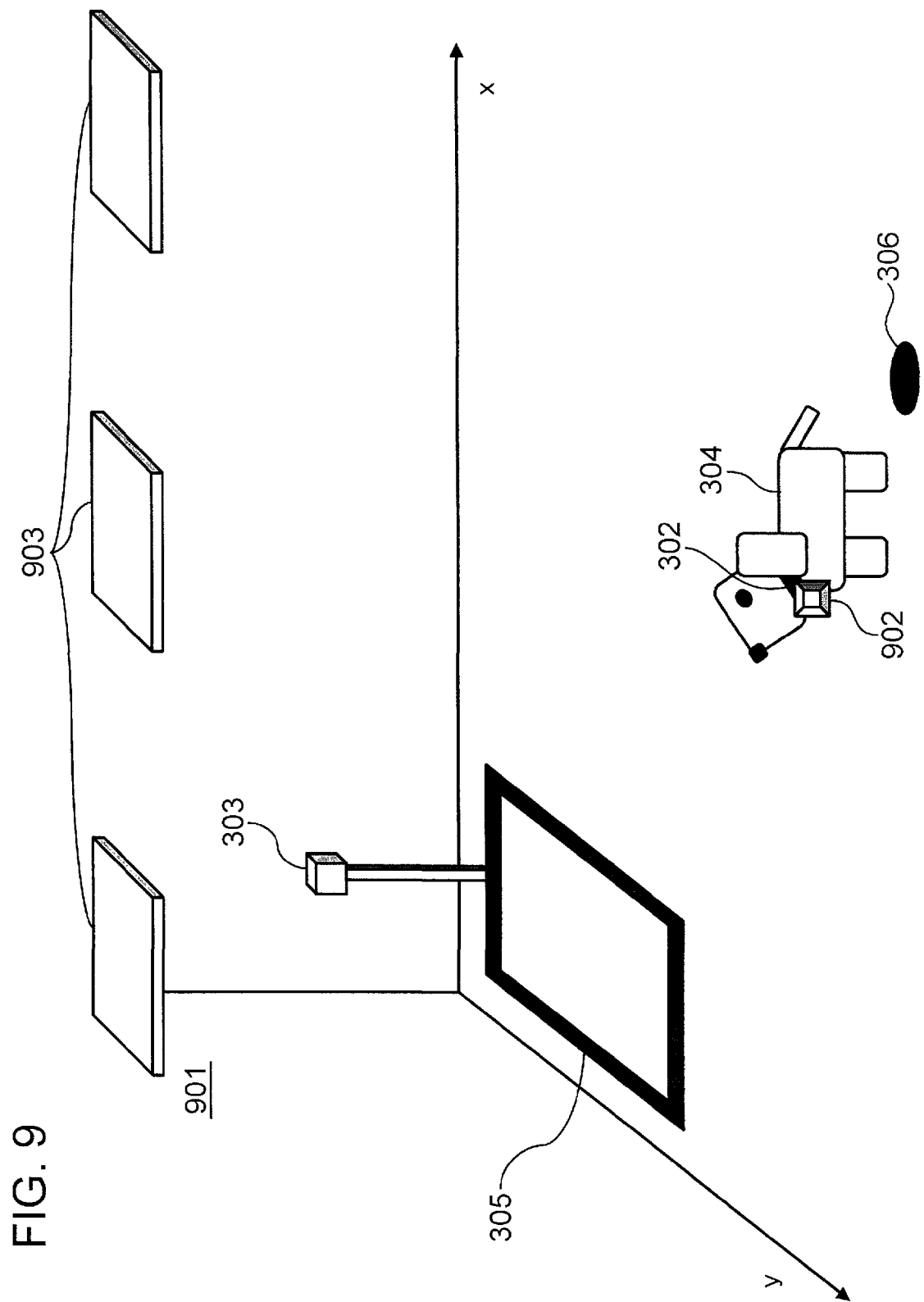
FIG. 9 is a diagram showing an example of a living space in the excrement detection system according to the second embodiment.

FIG. 9 is a diagram showing a breeding environment 901 as an example of a living space of a pet to which the excrement detection system has been introduced. A pet toilet 305, a dog 304, a radio tag antenna 903, and feces 306 are present in the breeding environment 901. An image sensor 303 as an example of the toilet observing apparatus 103 is installed in the pet toilet 305. An odor sensor 302 as an example of the excretion information acquiring apparatus 101 and a radio tag 902 of a radio tag system as an example of the pet observing apparatus 701 are mounted to the dog 304. A radio tag antenna 903 is mounted on the ceiling and measures a distance to the radio tag 902. The feces 306 have been excreted by the dog 304 outside of the pet toilet 305.

Description of Flow Chart

Figure 8:
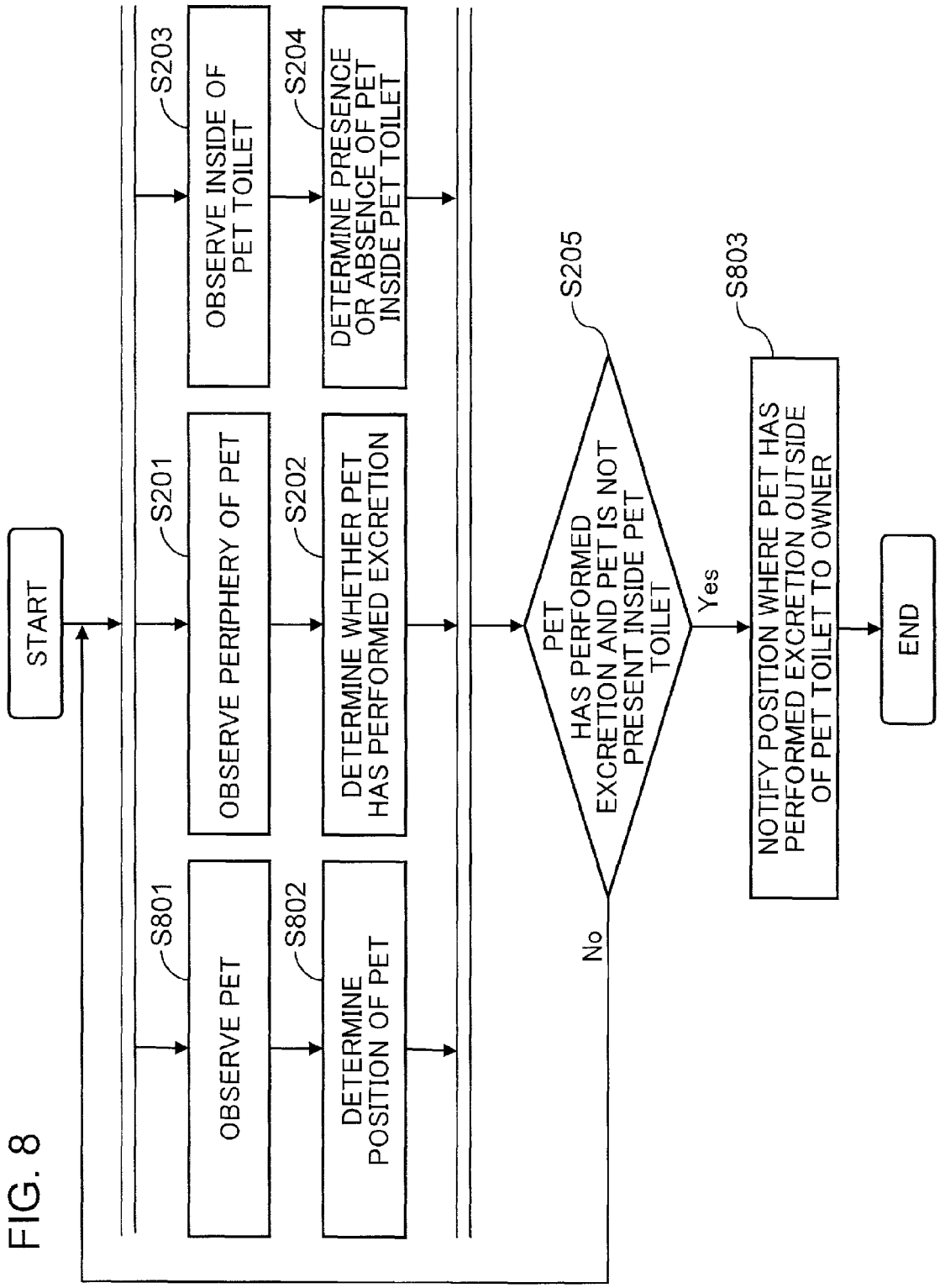
FIG. 8 is a flow chart showing overall processing by the excrement detection system according to the second embodiment.

FIG. 8 is a flow chart representing overall processing of the excrement detection system according to the second embodiment. Hereinafter, operations of the respective components will be described in correspondence with the flow chart shown in FIG. 8.

The respective steps other than steps S801, S802, and S803 are similar to the contents described in the first embodiment. Therefore, a detailed description thereof will be omitted.

In step S801, the radio tag antenna 903 acquires a distance to the radio tag 902 at a predetermined observation cycle (for example, 1 second).

In step S802, the position information processing unit 702 calculates a position of the radio tag 902 in the breeding environment 901 based on the distance to the radio tag 902 acquired by the radio tag antenna 903.

In FIG. 8, steps S801 and S802 are repetitively executed at a predetermined observation cycle by the pet observing apparatus 701 and the position information processing unit 702.

FIG. 10 is a diagram showing an example of a processing history of the position information processing unit 702. FIG. 10 shows an example where the dog 304 was present at coordinate (x, y)=(100, 100) in the breeding environment 901 at 12:00:01 on Sep. 2, 2012 and the dog 304 had moved to, and has since stayed, at coordinate (x, y)=(300, 500) at 12:00:06 on the same day.

When the excretion position determining unit 105 determines that the dog 304 has performed excretion outside the pet toilet 305 (Yes in S205), processing advances to step S803. In step S803, the notification control unit 106 controls the notifying apparatus 107 and causes the notifying apparatus 107 to notify an excretion position at which the dog 304 had performed excretion outside of the pet toilet 305 to the owner of the dog 304.

In this case, the excretion position is the position (300, 500) of the dog 304 at 12:00:09 on Sep. 2, 2012 at which the excretion information processing unit 102 determines that excrement is present around the dog 304 (refer to FIG. 4) and, at the same time, the excretion position determining unit 105 determines that the dog 304 is not present in the pet toilet 305 (refer to FIG. 5).

Figure 11:
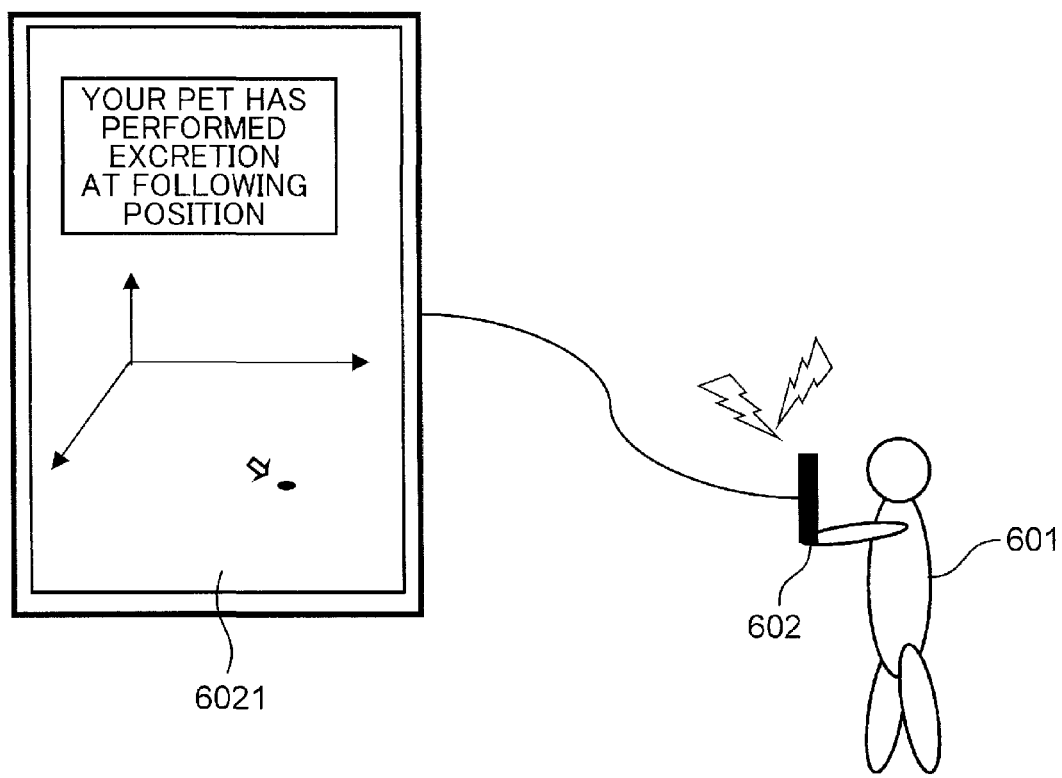
FIG. 11 is a diagram showing an example of a notifying method in the excrement detection system according to the second embodiment.

FIG. 11 is a diagram showing an example of a mobile terminal 602 as an example of the notifying apparatus 107. In FIG. 11, the notification control unit 106 causes a display unit 6021 of the mobile terminal 602 to display a text reading "Your pet has performed excretion at the following position" and indicate a position of feces by an arrow. Due to this display, the fact that the dog 304 has performed excretion outside the pet toilet 305 and the position thereof is notified using a text and a diagram of the breeding environment 901 to an owner 601 of the dog 304.

As described above, in the second embodiment, when the excretion position determining unit 105 determines that a pet has performed excretion outside a pet toilet, an excretion position at which the pet had performed excretion outside of the pet toilet is notified to the owner of the pet based on a position of the pet as calculated by the position information processing unit 702. Therefore, according to the second embodiment, the owner of the pet can reduce adherence of the odor of excrement by immediately treating the excrement outside of the pet toilet.

Third Embodiment

In a third embodiment, whether or not a pet has performed excretion is determined based on excretion information and a history of a position of the pet.

Figure 12:
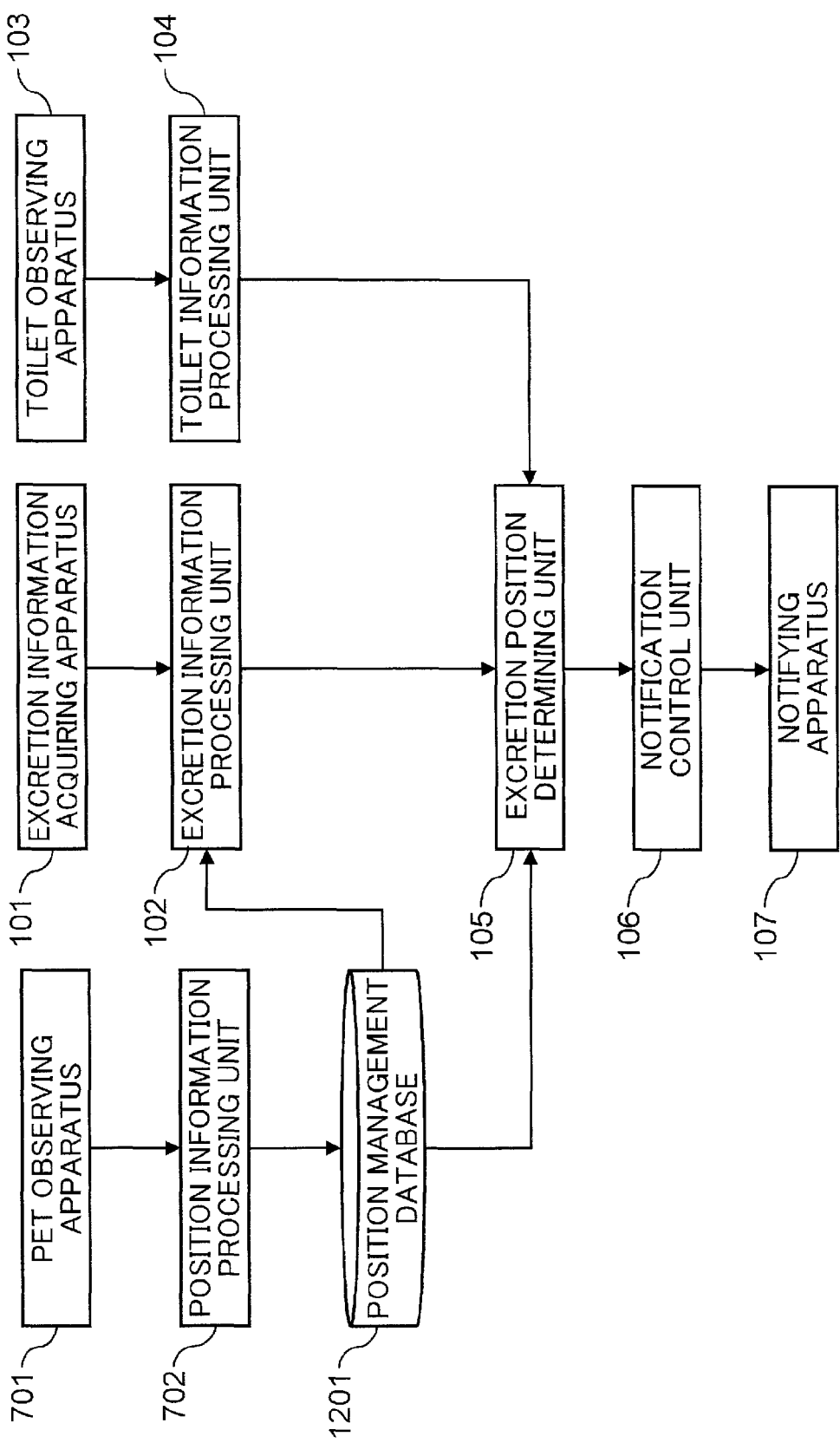
FIG. 12 is a block diagram showing a configuration of an excrement detection system according to a third embodiment.

FIG. 12 is a block diagram showing a configuration of an excrement detection system according to the third embodiment.

The excrement detection system according to the third embodiment includes an excretion information acquiring apparatus 101, an excretion information processing unit 102, a toilet observing apparatus 103, a toilet information processing unit 104, an excretion position determining unit 105, a notification control unit 106, a notifying apparatus 107, a pet observing apparatus 701, a position information processing unit 702, and a position management database 1201.

The respective components other than the position management database 1201 and the excretion information processing unit 102 are similar to the contents described in the first or second embodiment. Therefore, a detailed description thereof will be omitted.

Description of Position Management Database 1201

A position of a pet as calculated by the position information processing unit 702 and an observation time at which the pet observing apparatus 701 had observed the pet are recorded together in the position management database 1201. The position information processing unit 702 assumes the time at which pet information was received from the pet observing apparatus 701 as an observation time and, for example, records the observation time and the calculated position of the pet in association with one another in the position management database 1201 as shown in FIG. 10.

Description of Excretion Information Processing Unit 102

The excretion information processing unit 102 determines whether or not the pet has performed excretion based on the excretion information acquired by the excretion information acquiring apparatus 101 and a history of the position of the pet that is recorded in the position management database 1201.

Generally, many animals including dogs and cats become stationary when performing excretion. Therefore, the excretion information processing unit 102 determines that the pet has performed excretion only when it is determined that excrement is present around the pet after the position of the pet remains unchanged for a predetermined period of time.

The determination of whether or not excrement is present around the pet is similar to the contents described with respect to the excretion information processing unit 102 according to the first embodiment.

In this case, the predetermined period of time is desirably determined based on the time from the start of excretion to the end of excretion by the pet. For example, a time such as 5 seconds or 10 seconds can be set as the predetermined period of time.

In addition, for example, the position information processing unit 702 may determine whether or not the position of the pet changes based on a difference distance from a previous position of the pet. Even if the pet is stationary, a deviation may occur in the position of the pet due to an observation error by the pet observing apparatus 701. Therefore, the position information processing unit 702 desirably determines that a change has occurred in the position of the pet when the difference distance is long and determines that a change has not occurred in the position of the pet when the difference distance is short.

A threshold for determining whether the difference distance is long or short is desirably set based on error characteristics of a sensor that is used as the pet observing apparatus 701 or on a position estimating algorithm used by the position information processing unit 702. For example, when a radio tag system is used as the pet observing apparatus 701, the threshold may be set to 30 cm. Alternatively, when an ultrasonic tag system that has a higher positional accuracy than the radio tag system is used as the pet observing apparatus 701, the threshold may be set to 10 cm.

In addition, when simply using a background difference method and assuming a center of a difference area to be a position of the pet as a position estimating algorithm of the position information processing unit 702 in case an image sensor is used as the pet observing apparatus 701, for example, the threshold may be set to 30 cm. Alternatively, when further using Bayesian filtering to stochastically estimate a position of the pet as a position estimating algorithm of the position information processing unit 702 in case an image sensor is used as the pet observing apparatus 701, for example, the threshold may be set to 10 cm.

Regardless of the sensor or algorithm to be used, accuracy of position estimation is affected by the surrounding environment (for example, lighting conditions in the case of an image sensor). Therefore, desirably, error characteristics are identified in advance by a preliminary experiment to set the threshold.

Description of Flow Chart

Figure 13:
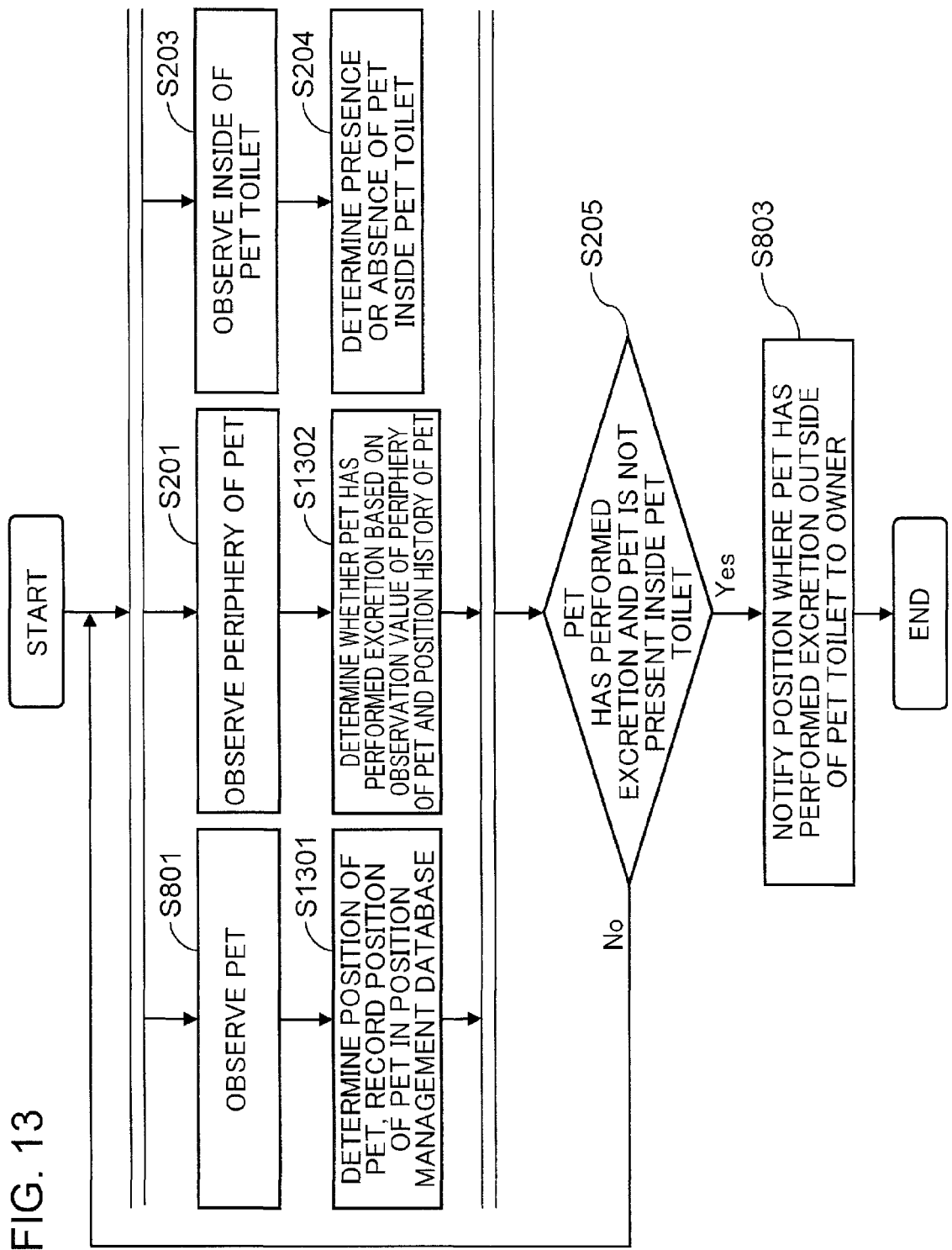
FIG. 13 is a flow chart showing overall processing by the excrement detection system according to the third embodiment.

FIG. 13 is a flow chart representing overall processing of the excrement detection system according to the third embodiment. Hereinafter, operations of the respective components in the breeding environment 901 shown in FIG. 9 will be described in correspondence with the flow chart shown in FIG. 13.

The respective steps other than steps S1301 and S1302 are similar to the contents described in the first or second embodiment. Therefore, a detailed description thereof will be omitted.

Step S1301 is executed following step S801. In step S1301, the position information processing unit 702 calculates a position of the radio tag 902 in the breeding environment 901 based on the distance to the radio tag 902 as acquired by the radio tag antenna 903. In addition, the position information processing unit 702 records the observation time at which the radio tag antenna 903 (the pet observing apparatus 701) had acquired the distance to the radio tag 902 and the calculated position in association with one another in the position management database 1201 as shown in FIG. 10. While FIG. 10 has been described as an example of a processing history of the position information processing unit 702 in the second embodiment, FIG. 10 will be described as an example of the position management database 1201 in the third embodiment.

Step S1302 is executed following step S201. In step S1302, the excretion information processing unit 102 determines whether or not the dog 304 has performed excretion based on odor information acquired by the odor sensor 302 and a history of a position of the dog 304 that is recorded in the position management database 1201.

A case will be described where the period of time during which the dog 304 is stationary prior to performing excretion is set to 5 seconds and a distance threshold for determining that a change has occurred in the position of the dog 304 is set to 10 cm.

In the example of the position management database 1201 shown in FIG. 10, a change no longer occurs in the position of the dog 304 from 12:00:06 on Sep. 2, 2012. 3 seconds later at 12:00:09 on Sep. 2, 2012, the excretion information processing unit 102 determines that excrement is present around the dog 304 (refer to FIG. 4). In addition, also at 12:00:09 on Sep. 2, 2012, the toilet information processing unit 104 determines that the dog 304 is not present in the pet toilet 305 (refer to FIG. 5). However, at 12:00:09 on Sep. 2, 2012, 5 seconds which is set as the period of time during which the dog 304 is stationary prior to performing excretion has not yet elapsed. Therefore, the excretion information processing unit 102 determines that the dog 304 has not yet performed excretion at this time.

A further 2 seconds later at 12:00:11 on Sep. 2, 2012, as the stationary time of the dog 304 reaches 5 seconds that is set as the period of time during which the dog 304 is stationary prior to performing excretion, the excretion information processing unit 102 determines that excrement is present around the dog 304 (refer to FIG. 4). Therefore, the excretion information processing unit 102 determines that the dog 304 has performed excretion. Furthermore, the toilet information processing unit 104 determines that the dog 304 is not present in the pet toilet 305 (refer to FIG. 5). Therefore, step S205 yields a Yes result and the excretion position determining unit 105 determines that the dog 304 has performed excretion outside of the pet toilet 305.

In FIG. 13, steps S201 and S1302 are repetitively executed at a predetermined observation cycle by the excretion information acquiring apparatus 101 and the excretion information processing unit 102. Steps S801 and S1301 are repetitively executed at a predetermined observation cycle by the pet observing apparatus 701 and the position information processing unit 702.

As described above, in the third embodiment, the excretion information processing unit 102 does not determine that a pet has performed excretion unless a stationary time of the pet reaches a predetermined time in the position management database 1201 which records a history of a position of the pet. Therefore, according to the third embodiment, even in a case where the excretion information acquiring apparatus 101 erroneously detects a foreign object other than excrement to be excrement, an erroneous notification can be prevented from being issued to the owner of the pet.

Fourth Embodiment

In a fourth embodiment, a determination that a pet has not performed excretion is made when a position of the pet approaches a position of an odor source which has been recorded in advance.

Figure 14:
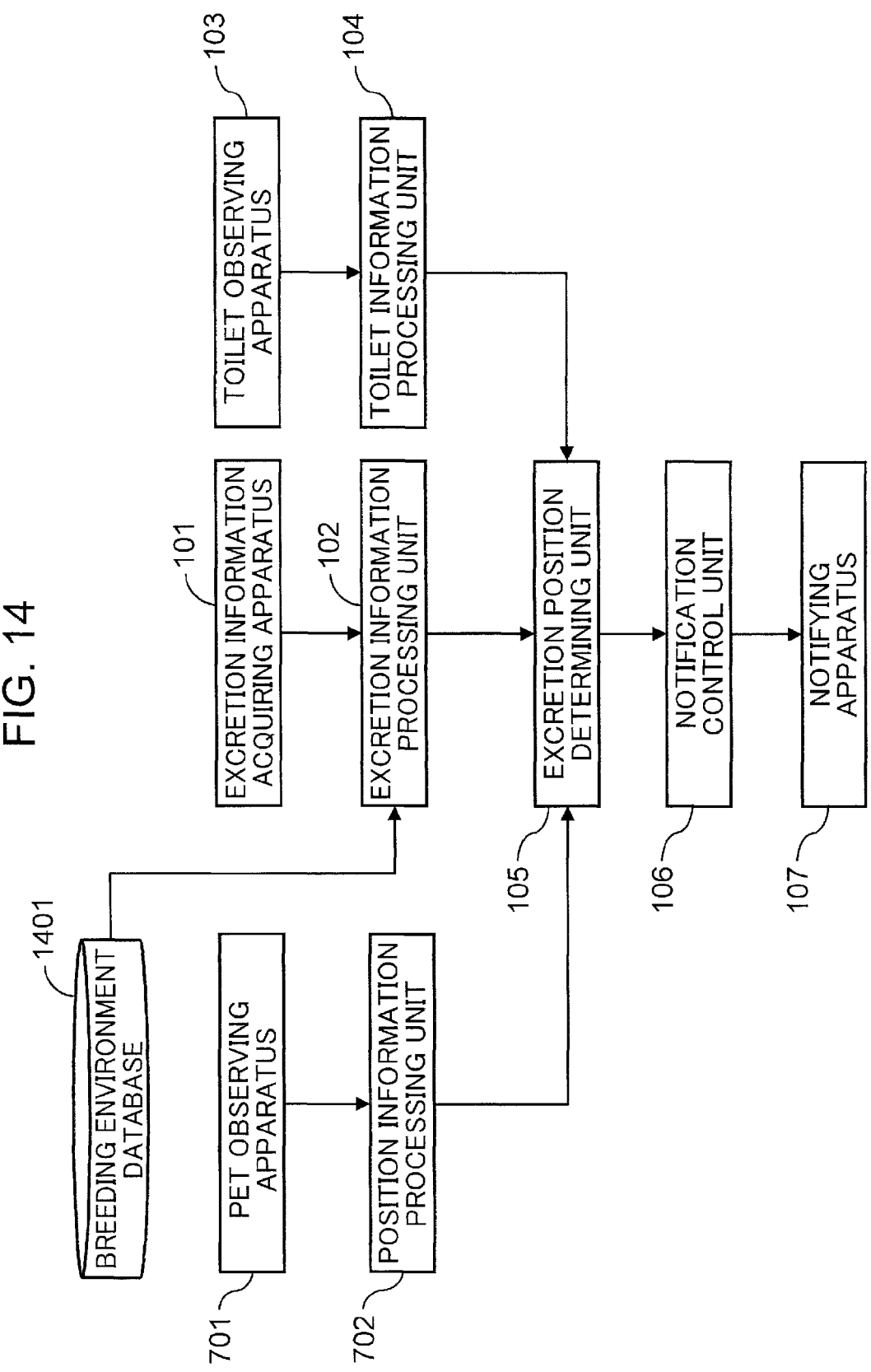
FIG. 14 is a block diagram showing a configuration of an excrement detection system according to a fourth embodiment.

FIG. 14 is a block diagram showing a configuration of an excrement detection system according to the fourth embodiment.

The excrement detection system according to the fourth embodiment includes an excretion information acquiring apparatus 101, an excretion information processing unit 102, a toilet observing apparatus 103, a toilet information processing unit 104, an excretion position determining unit 105, a notification control unit 106, a notifying apparatus 107, a pet observing apparatus 701, a position information processing unit 702, and a breeding environment database 1401.

The respective components other than the breeding environment database 1401 and the excretion information processing unit 102 are similar to the contents described in any of the first to third embodiments. Therefore, a detailed description thereof will be omitted.

Description of Breeding Environment Database 1401

The breeding environment database 1401 at least records information regarding an odor source in the living space.

Figure 16:
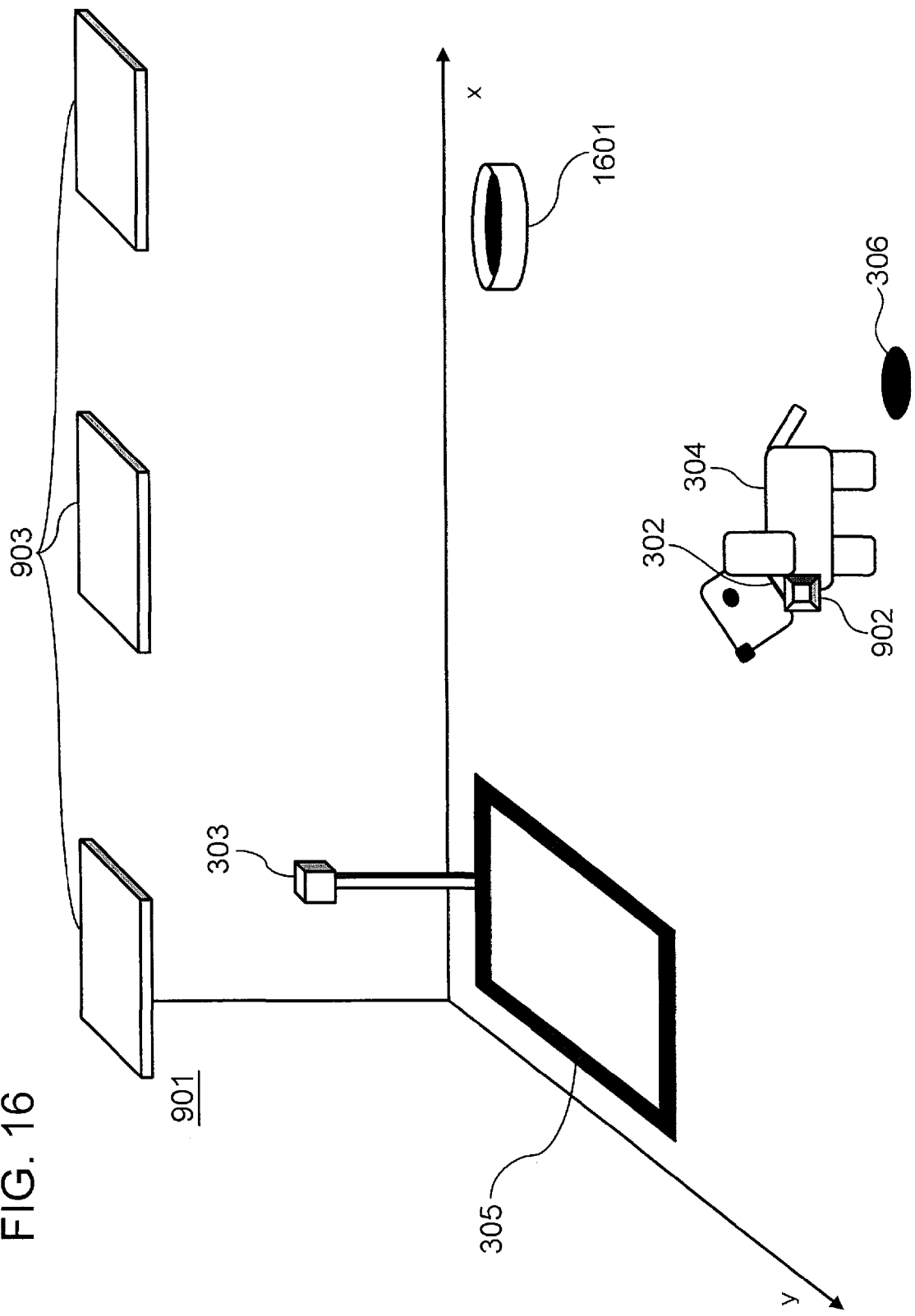
FIG. 16 is a diagram showing an example of a living space in the excrement detection system according to the fourth embodiment.

FIG. 16 is a diagram showing another example of the breeding environment 901. A pet toilet 305, a dog 304, a radio tag antenna 903, feces 306, and a feeding place 1601 are present in the breeding environment 901. The feeding place 1601 is a place where the dog 304 is fed. Moreover, as shown in FIG. 16, the excretion information acquiring apparatus 101 according to the fourth embodiment is an odor sensor 302.

FIG. 17 is a diagram showing an example of the breeding environment database 1401. As information regarding an odor source in the breeding environment 901, the breeding environment database 1401 shown in FIG. 17 records an installation position of the feeding place 1601 (described as a "food bowl" in FIG. 17) and an installation position of the pet toilet 305. Installation positions of the feeding place 1601 and the pet toilet 305 are recorded in advance in the breeding environment database 1401 by a user.

Description of Excretion Information Processing Unit 102

The excretion information processing unit 102 determines whether or not the pet has performed excretion based on the excretion information acquired by the excretion information acquiring apparatus 101, a position of the pet that is calculated by the position information processing unit 702, and a position of the odor source that is recorded in the breeding environment database 1401.

First, the excretion information processing unit 102 determines whether or not there is an odor component at a concentration that enables determination of the presence of excrement around the pet. When the excretion information processing unit 102 determines that there is an odor component, the excretion information processing unit 102 determines that the pet has not performed excretion if a position of the pet as calculated by the position information processing unit 702 and a position of the odor source that is recorded in the breeding environment database 1401 are close to one another. On the other hand, the excretion information processing unit 102 determines that the pet has performed excretion if the position of the pet and the position of the odor source are far from one another.

In this case, the excretion information processing unit 102 determines whether or not the position of the pet and the position of the odor source are close to one another based on a distance threshold. For example, the threshold may be set to a value such as 50 cm or 70 cm. Moreover, the threshold is desirably determined based on an odor detection accuracy of the odor sensor 302 as the excretion information acquiring apparatus 101.

In addition, the determination of whether or not excrement is present around the pet is similar to the contents described with respect to the excretion information processing unit 102 according to the first embodiment.

Description of Flow Chart

Figure 15:
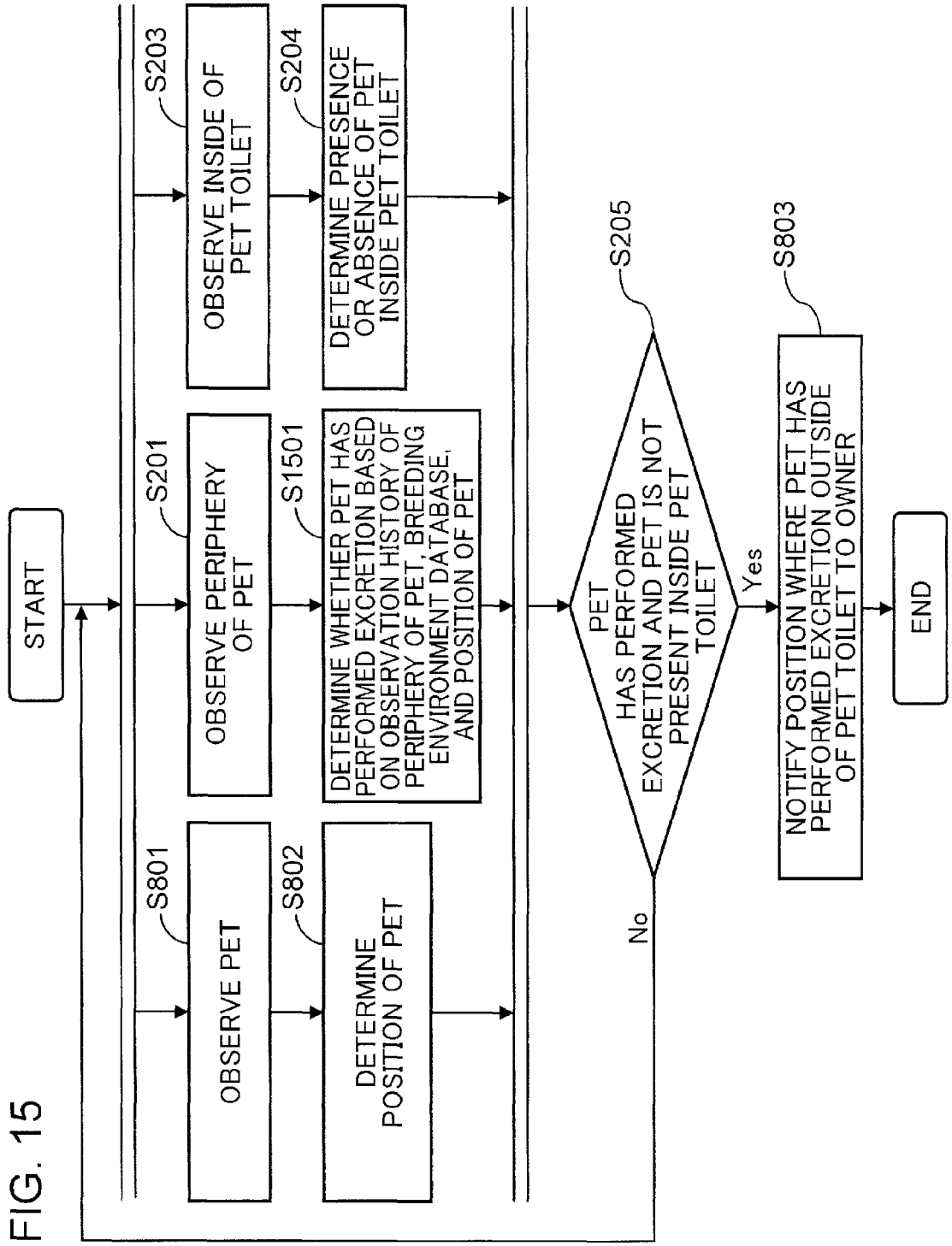
FIG. 15 is a flow chart showing overall processing by the excrement detection system according to the fourth embodiment.

FIG. 15 is a flow chart representing overall processing of the excrement detection system according to the fourth embodiment. FIG. 18 is a diagram showing an example of a history of a position of the dog 304 as calculated by the position information processing unit 702. FIG. 19 is a diagram showing an example of a determination history of the excretion information processing unit 102. Hereinafter, operations of the respective components in the breeding environment 901 shown in FIG. 16 will be described in correspondence with the flow chart shown in FIG. 15.

Respective steps other than step S1501 are similar to the contents described in any of the first to third embodiments. Therefore, a detailed description thereof will be omitted.

Step S1501 is executed following step S201. In step S1501, the excretion information processing unit 102 determines whether or not the dog 304 has performed excretion based on odor information acquired by the odor sensor 302, a position of the dog 304 as calculated by the position information processing unit 702, and the breeding environment database 1401.

In the example shown in FIG. 19, the excretion information processing unit 102 determines for the first time that the dog 304 had performed excretion at 12:00:09 on Sep. 2, 2012. As shown in FIG. 19, a higher odor value than an odor value at 12:00:09 on Sep. 2, 2012 has been recorded at 12:00:01 on Sep. 2, 2012. However, at this time, the excretion information processing unit 102 does not determine that the dog 304 had performed excretion. The reason for this is as described below.

Specifically, as shown in FIG. 18, a position of the dog 304 at 12:00:01 on Sep. 2, 2012 is the same as a position of the feeding place 1601 that is recorded in the breeding environment database 1401. Therefore, the excretion information processing unit 102 determines that the odor value recorded at 12:00:01 on Sep. 2, 2012 had been acquired by detecting an odor component of the feeding place 1601 instead of excrement.

As described above, in the fourth embodiment, even if the excretion information processing unit 102 determines that there is an odor component at a concentration that enables determination of the presence of excrement around a pet, the excretion information processing unit 102 determines that the pet has not performed excretion if a position of the pet and an odor source recorded in advance are close to one another. Therefore, according to the fourth embodiment, an erroneous notification can be prevented from being issued to the owner of the pet.

Fifth Embodiment

In a fifth embodiment, a prediction that a pet may possibly perform excretion is made when the pet approaches a position at which the pet had previously performed excretion outside the pet toilet.

Figure 20:
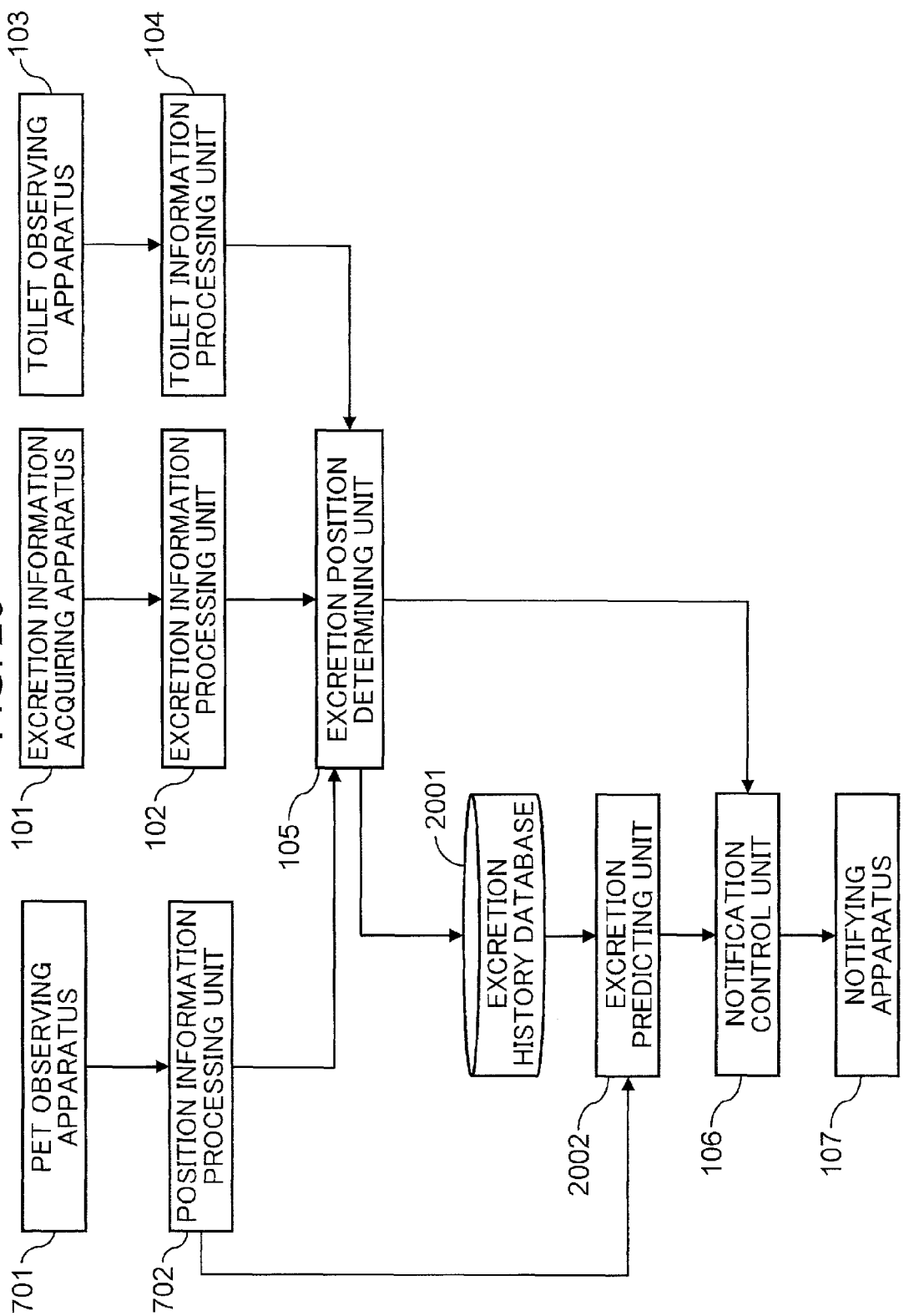
FIG. 20 is a block diagram showing a configuration of an excrement detection system according to a fifth embodiment.

FIG. 20 is a block diagram showing a configuration of an excrement detection system according to the fifth embodiment.

The excrement detection system according to the fifth embodiment includes an excretion information acquiring apparatus 101, an excretion information processing unit 102, a toilet observing apparatus 103, a toilet information processing unit 104, an excretion position determining unit 105, a notification control unit 106, a notifying apparatus 107, a pet observing apparatus 701, a position information processing unit 702, an excretion history database 2001, and an excretion predicting unit 2002.

The respective components other than the excretion position determining unit 105, the excretion history database 2001, and the excretion predicting unit 2002 are similar to the contents described in any of the first to fourth embodiments. Therefore, a detailed description thereof will be omitted.

Description of Excretion Position Determining Unit 105

When the excretion position determining unit 105 determines that the dog 304 has performed excretion outside of the pet toilet 305, the excretion position determining unit 105 records a position at which the dog 304 had performed excretion in the excretion history database 2001. Moreover, a determination method used by the excretion position determining unit to determine whether or not the dog 304 has performed excretion outside of the pet toilet 305 is similar to the contents described in any of the first to fourth embodiments.

Description of Excretion History Database 2001

The excretion history database 2001 at least records a position at which the pet (the dog 304) had performed excretion outside of the pet toilet 305.

Figure 23:
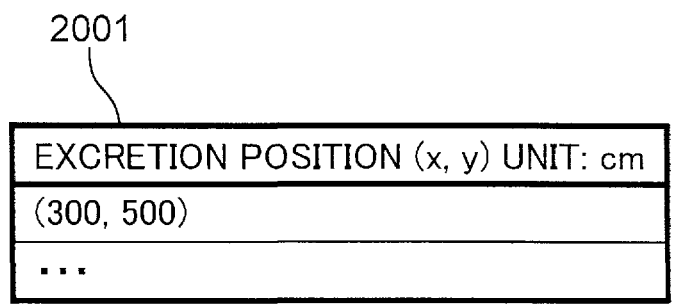
FIG. 23 is a diagram showing an example of an excretion history database in the excrement detection system according to the fifth embodiment.

FIG. 23 is a diagram showing an example of the excretion history database 2001. The fact that the dog 304 had previously performed excretion at coordinate (300, 500) in the breeding environment 901 is recorded in the excretion history database 2001 shown in FIG. 23.

Description of Excretion Predicting Unit 2002

The excretion predicting unit 2002 predicts that the pet is about to perform excretion based on a position of the pet as calculated by the position information processing unit 702 and on a history of excretion positions of the pet as recorded in the excretion history database 2001.

Generally, dogs, cats, and the like tend to think that a place at which excretion was once performed and to which the odor of excrement has adhered to be a toilet even if the place is outside of a pet toilet. Therefore, even if excrement is disposed, a pet may repetitively perform excretion at the same place if the odor of the excrement cannot be removed.

In consideration thereof, the excretion predicting unit 2002 predicts that the pet is about to perform excretion when the position of the pet as calculated by the position information processing unit 702 approaches a previous excretion position of the pet which is outside of the pet toilet 305 and which is recorded in the excretion history database 2001.

In this case, the excretion predicting unit 2002 determines whether or not the position of the pet and a previous excretion position are close to one another based on a distance threshold. For example, the threshold may be set to a value such as 50 cm or 70 cm. Moreover, the threshold is desirably set based on error characteristics of a sensor that is used as the pet observing apparatus 701 or on a position estimating algorithm that is used by the position information processing unit 702. For example, if positional error characteristics identified in advance by a preliminary experiment are small, the threshold may be set to 50 cm. On the other hand, if positional error characteristics are large, the threshold may be set to 70 cm.

Description of Flow Chart

Figure 21:
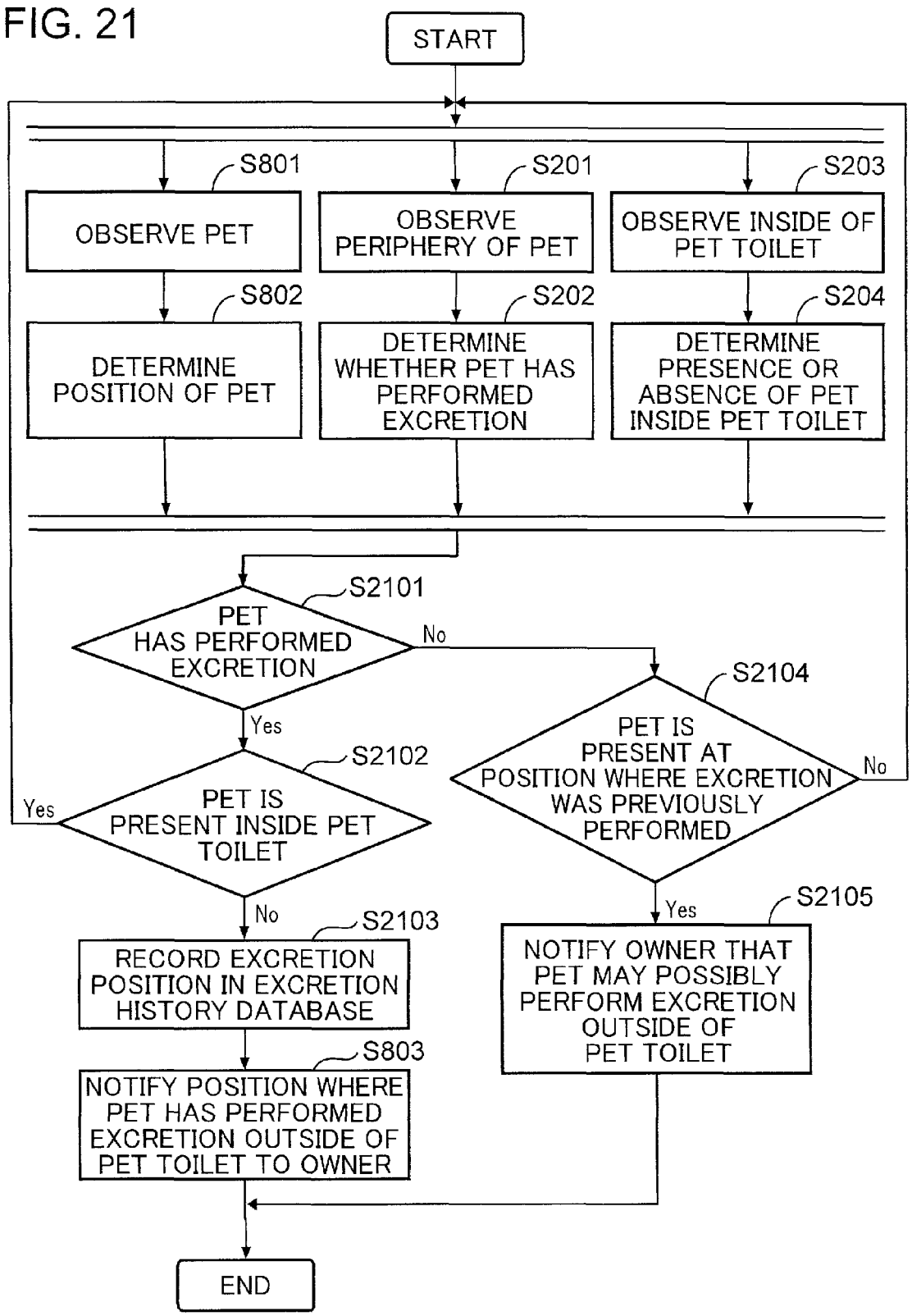
FIG. 21 is a flow chart showing overall processing by the excrement detection system according to the fifth embodiment.
Figure 22:
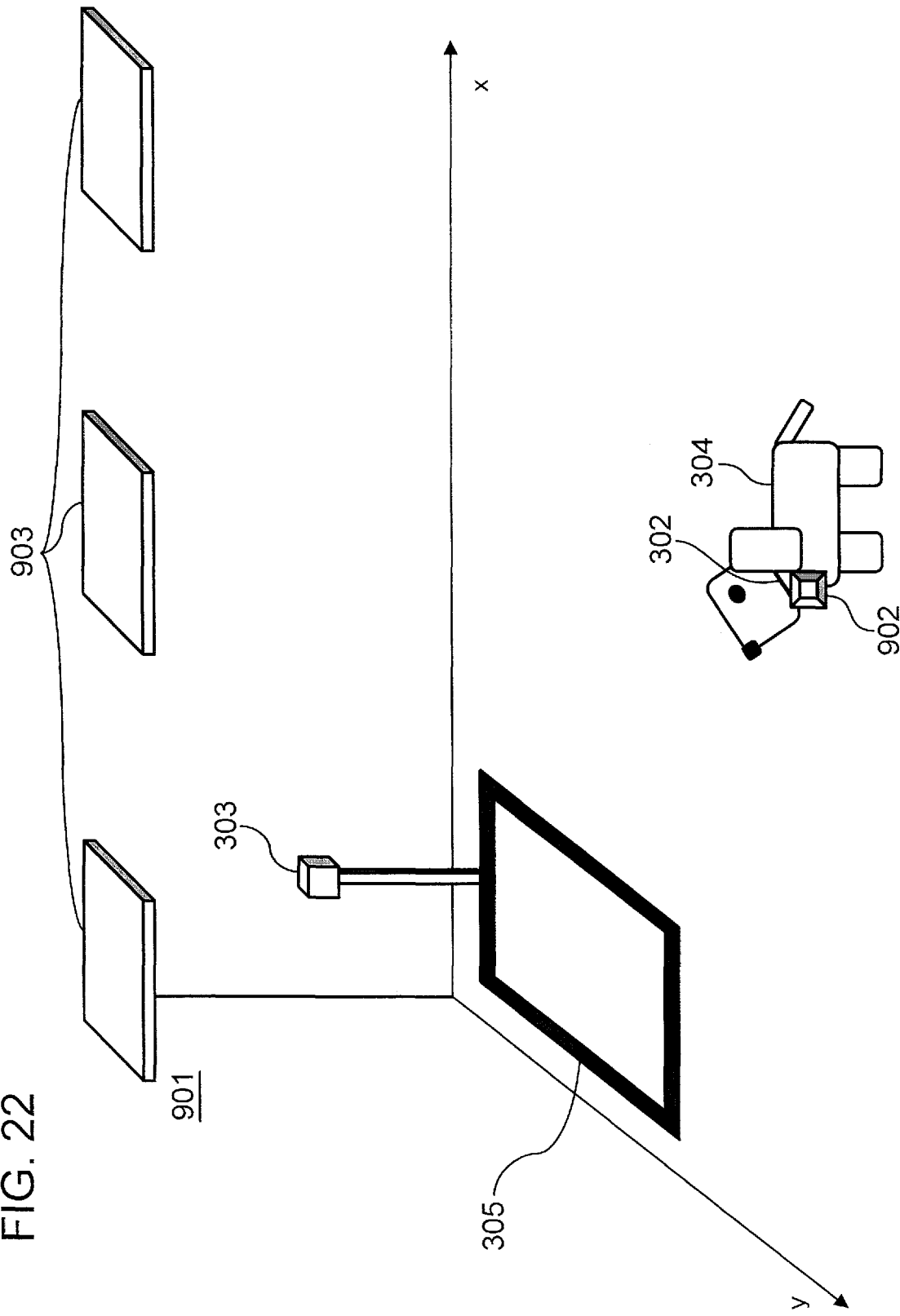
FIG. 22 is a diagram showing an example of a living space in the excrement detection system according to the fifth embodiment.

FIG. 21 is a flow chart representing overall processing of the excrement detection system according to the fifth embodiment. FIG. 22 is a diagram showing another example of the breeding environment 901. Hereinafter, operations of the respective components in the breeding environment 901 shown in FIG. 22 will be described in correspondence with the flow chart shown in FIG. 21.

Respective steps other than steps S2101 to S2105 are similar to the contents described in any of the first to fourth embodiments. Therefore, a detailed description thereof will be omitted.

In step S2101, the excretion position determining unit 105 determines whether or not the dog 304 has performed excretion based on a determination result of the excretion information processing unit 102. When the dog 304 has performed excretion (Yes in step S2101), the processing advances to step S2102. On the other hand, when the dog 304 has not performed excretion (No in step S2101), the processing advances to step S2104.

Excretion has not been performed in the breeding environment 901 shown in FIG. 22. In this case, the processing advances to step S2104.

In step S2102, the excretion position determining unit 105 receives a determination result of the toilet information processing unit 104 and determines whether or not the dog 304 is present in the pet toilet 305. When the dog 304 is present in the pet toilet 305 (Yes in step S2102), the processing advances to step S201, then S202, and then S801. On the other hand, when the dog 304 is not present in the pet toilet 305 (No in step S2102), the processing advances to step S2103.

In step S2103, the excretion position determining unit 105 records a position where the dog 304 had performed excretion outside of the pet toilet 305 in the excretion history database 2001 and the processing advances to step S803.

In step S2104, the excretion predicting unit 2002 determines whether or not the dog 304 is present at a previous excretion position outside of the pet toilet 305 which is recorded in the excretion history database 2001 based on the position of the pet as calculated by the position information processing unit 702. When the dog 304 is present at a previous excretion position outside of the pet toilet 305 (Yes in step S2104), the processing advances to step S2105. On the other hand, when the dog 304 is not present at a previous excretion position outside of the pet toilet 305 (No in step S2104), the processing advances to step S201, then S203, and then S801.

In step S2105, the notification control unit 106 controls the notifying apparatus 107 and causes the notifying apparatus 107 to notify the possibility that the dog 304 may perform excretion outside of the pet toilet 305 to the owner of the dog 304.

Figure 24:
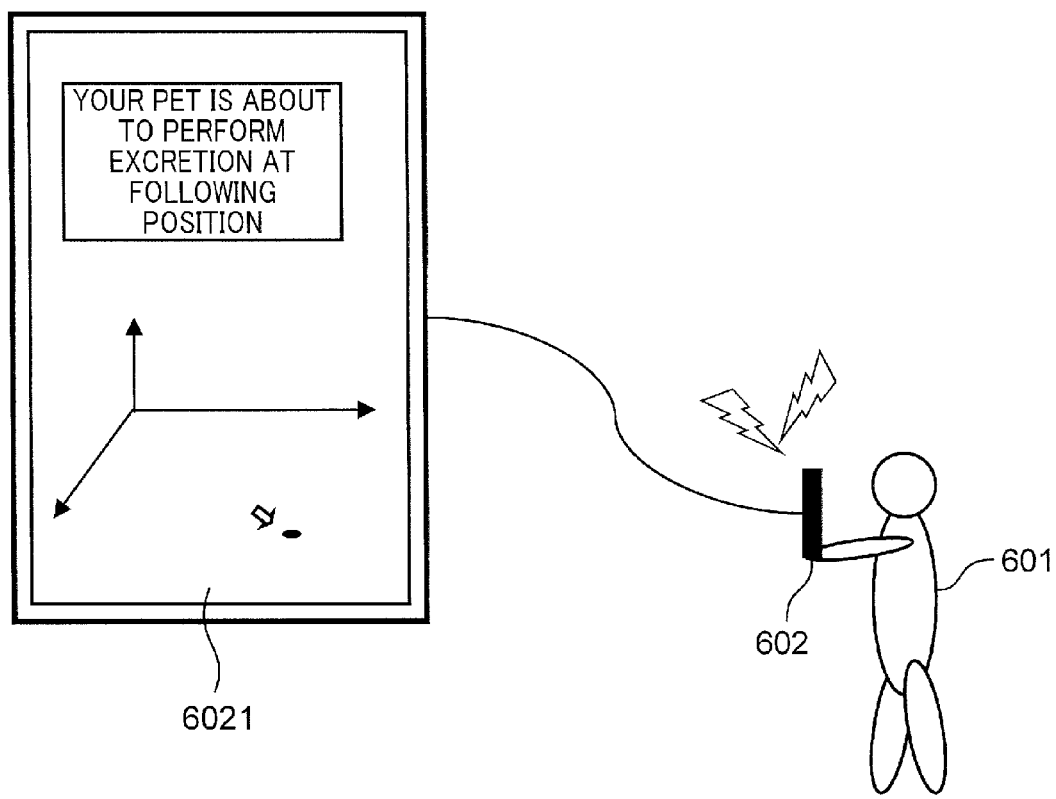
FIG. 24 is a diagram showing an example of a notifying method in the excrement detection system according to the fifth embodiment.

FIG. 24 is a diagram showing an example of a mobile terminal 602 as an example of the notifying apparatus 107. In FIG. 24, the notification control unit 106 causes a display unit 6021 of the mobile terminal 602 to display a text reading "Your pet is about to perform excretion at the following position" and indicate a predicted excretion position by an arrow. Due to this display, the fact that the dog 304 may possibly perform excretion outside the pet toilet 305 and the position thereof is notified using a text and a diagram of the breeding environment 901 to an owner 601 of the dog 304.

Moreover, the excretion position determining unit 105 may record the time at which the dog 304 has performed excretion, the number of times the dog 304 has performed excretion, or the like in the excretion history database 2001. For example, the excretion predicting unit 2002 may predict that excretion is to be performed only when the number of times excretion has been performed at a same location is large (when the number of times excretion has been performed at a same location is equal to or larger than the number of times set in advance) and when the dog 304 approaches the position, and the notification control unit 106 may notify the owner of the dog 304 to that effect.

As described above, in the fifth embodiment, the excretion predicting unit 2002 predicts that the pet is about to perform excretion when the position of the pet as calculated by the position information processing unit 702 approaches a previous excretion position of the pet which is outside of the pet toilet 305 and which is recorded in the excretion history database 2001. The notification control unit 106 notifies the prediction by the excretion predicting unit 2002 to the owner of the pet. Therefore, according to the fifth embodiment, the pet can be prevented from performing excretion outside of the pet toilet 305.

Sixth Embodiment

In a sixth embodiment, a prediction that a pet may possibly perform excretion is made when an excretion time of the pet is near and, at the same time, the pet approaches a position where the pet has previously performed excretion outside of the pet toilet.

Figure 25:
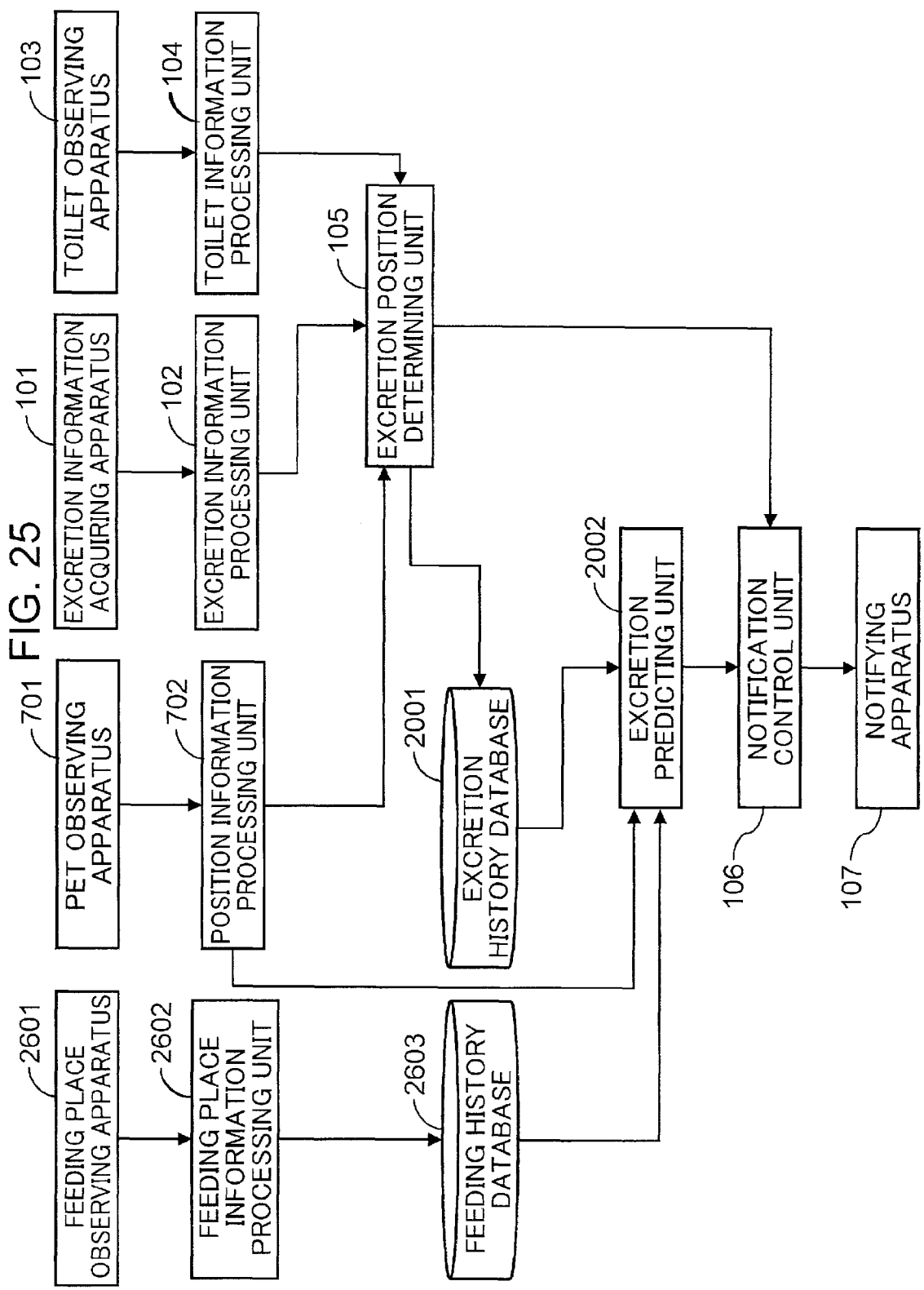
FIG. 25 is a block diagram showing a configuration of an excrement detection system according to a sixth embodiment.

FIG. 25 is a block diagram showing a configuration of an excrement detection system according to the sixth embodiment.

The excrement detection system according to the sixth embodiment includes an excretion information acquiring apparatus 101, an excretion information processing unit 102, a toilet observing apparatus 103, a toilet information processing unit 104, an excretion position determining unit 105, a notification control unit 106, a notifying apparatus 107, a pet observing apparatus 701, a position information processing unit 702, an excretion history database 2001, an excretion predicting unit 2002, a feeding place observing apparatus 2601, a feeding place information processing unit 2602, and a feeding history database 2603.

The respective components other than the excretion history database 2001, the excretion predicting unit 2002, the feeding place observing apparatus 2601, the feeding place information processing unit 2602, and the feeding history database 2603 are similar to the contents described in any of the first to fifth embodiments. Therefore, a detailed description thereof will be omitted.

Figure 27:
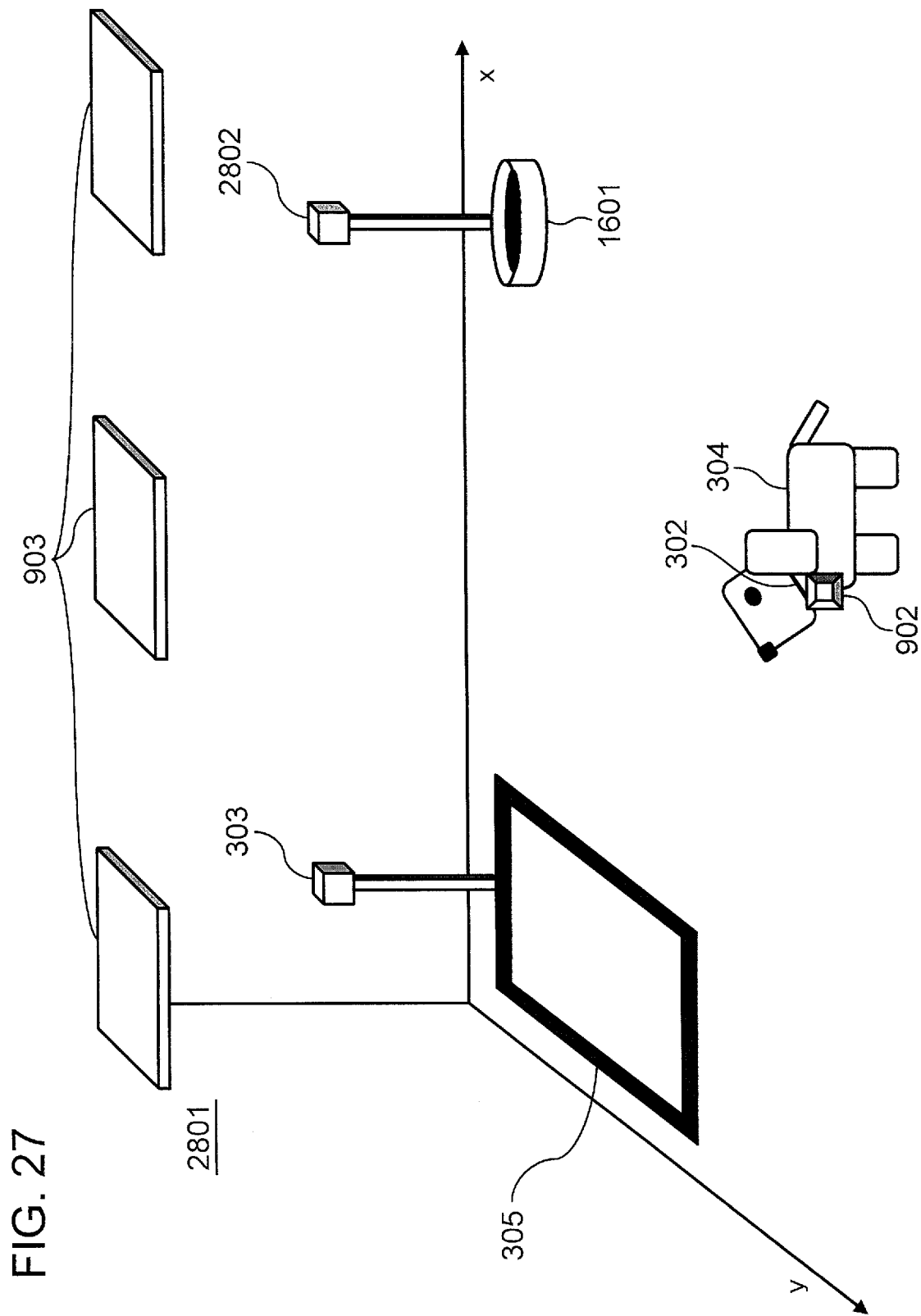
FIG. 27 is a diagram showing an example of a living space in the excrement detection system according to the sixth embodiment.

FIG. 27 is a diagram showing a breeding environment 2801. A pet toilet 305, a dog 304, a radio tag antenna 903, and a feeding place 1601 are present in the breeding environment 2801. An image sensor 2802 as an example of the feeding place observing apparatus 2601 is installed in the feeding place 1601.

Description of Feeding Place Observing Apparatus 2601

The feeding place observing apparatus 2601 is installed in a living space of the pet. In the example of the breeding environment 2801 shown in FIG. 27, the image sensor 2802 as an example of the feeding place observing apparatus 2601 is installed in the feeding place 1601. The feeding place observing apparatus 2601 observes the inside of the feeding place 1601 and acquires feeding place information including information regarding whether or not food of the pet is present in the feeding place 1601. For example, an odor sensor, an image sensor, or the like may be used as the feeding place observing apparatus 2601.

Moreover, the feeding place information that is acquired when using the odor sensor or the image sensor as the feeding place observing apparatus 2601 is similar to the content of toilet information described earlier with reference to the toilet observing apparatus 103 according to the first embodiment.

Description of Feeding Place Information Processing Unit 2602

The feeding place information processing unit 2602 determines whether or not the pet has eaten food from inside the feeding place 1601 based on the feeding place information acquired by the feeding place observing apparatus 2601.

When the odor sensor is used as the feeding place observing apparatus 2601, the odor sensor detects buildup and dissipation of an odor of the food. The feeding place information processing unit 2602 determines that the pet has eaten the food when the odor of the food dissipates. Moreover, a description of a method of determining the odor is similar to contents provided with respect to an odor sensor in the description of the excretion information acquiring apparatus 101 or the excretion information processing unit 102 according to the first embodiment.

Moreover, the same odor sensor as that used as the excretion information acquiring apparatus 101 may be used as the feeding place observing apparatus 2601. Even in this case, the feeding place information processing unit 2602 can determine whether or not pet food is present. Alternatively, an odor sensor which differs from that used as the excretion information acquiring apparatus 101 may be used as the feeding place observing apparatus 2601. For example, an odor sensor that is capable of detecting an odor component of pet food may be used as the feeding place observing apparatus 2601.

When the image sensor is used as the feeding place observing apparatus 2601, the image sensor detects an appearance and disappearance of an image portraying the food. The feeding place information processing unit 2602 determines that the pet has eaten the food when the image portraying the food disappears. Moreover, a background difference method, a histogram matching method, or the like may be used as a method of determining an image portraying food. The background difference method and the histogram matching method are similar to the contents described with respect to the excretion information processing unit 102 according to the first embodiment.

Description of Feeding History Database 2603

FIG. 28 is a diagram showing an example of the feeding history database 2603. The feeding history database 2603 records a time at which the pet had eaten food. When the feeding place information processing unit 2602 determines whether or not the pet has eaten food, the feeding place information processing unit 2602 records the time at which the determination is made in association with a determination result in the feeding history database 2603.

Description of Excretion History Database 2001

FIG. 29 is a diagram showing an example of the excretion history database 2001. A position where the pet had performed excretion outside of the pet toilet 305 and the time at which the pet had performed excretion are recorded in association with one another in the excretion history database 2001. Moreover, the time at which the pet had performed excretion outside of the pet toilet 305 is assumed to be an observation time at which the excretion information acquiring apparatus 101 had acquired excretion information representing the determination made by the excretion information processing unit 102 with respect to excretion by the pet.

As shown in FIG. 29, when the excretion position determining unit 105 determines whether or not the pet has performed excretion outside of the pet toilet 305, for each determination, the excretion position determining unit 105 records an observation time and the presence or absence of excretion in association with one another in the excretion history database 2001. When the excretion position determining unit 105 determines that the pet has performed excretion outside of the pet toilet 305, the excretion position determining unit 105 further records an excretion position in association with the observation time in the excretion history database 2001.

Description of Excretion Predicting Unit 2002

The excretion predicting unit 2002 predicts that the pet is about to perform excretion based on a position of the pet as calculated by the position information processing unit 702, a history of excretion positions of the pet as recorded in the excretion history database 2001, and a history of feeding times of the pet as recorded in the feeding history database 2603.

Generally, dogs, cats, and the like have fixed excretion timings on any given day. For example, a pet conceivably performs excretion upon waking up in the morning, after eating food, and the like.

In consideration thereof, the excretion predicting unit 2002 determines which time slot has a high frequency of excretion being performed based on a previous excretion history that is recorded in the excretion history database 2001. The excretion predicting unit 2002 predicts that the pet is attempting to perform excretion when the current time is included in the time slot with the high frequency and, at the same time, the position of the pet as calculated by the position information processing unit 702 approaches a previous excretion position as recorded in the excretion history database 2001.

Alternatively, the excretion predicting unit 2002 may determine a frequency of an elapsed time from feeding to performing excretion based on a previous excretion history that is recorded in the excretion history database 2001 and a previous feeding history that is recorded in the feeding history database 2603. The excretion predicting unit 2002 may predict that the pet is attempting to perform excretion when the current time is included in the time slot after feeding whose frequency is high and, at the same time, the position of the pet as calculated by the position information processing unit 702 approaches a previous excretion position as recorded in the excretion history database 2001.

In this case, for example, the time slot with a high frequency of excretion being performed may be a 1-hour segment such as from 1:00 to 2:00 or from 2:00 to 3:00. In addition, for example, the elapsed time from feeding to performing excretion may be a 1-hour segment such as 1 to 2 hours after feeding or 2 to 3 hours after feeding.

Moreover, the determination of whether or not the position of the pet and a previous excretion position have approached one another is similar to the contents described in the fifth embodiment. Therefore, a detailed description thereof will be omitted.

Description of Flow Chart

Figure 26:
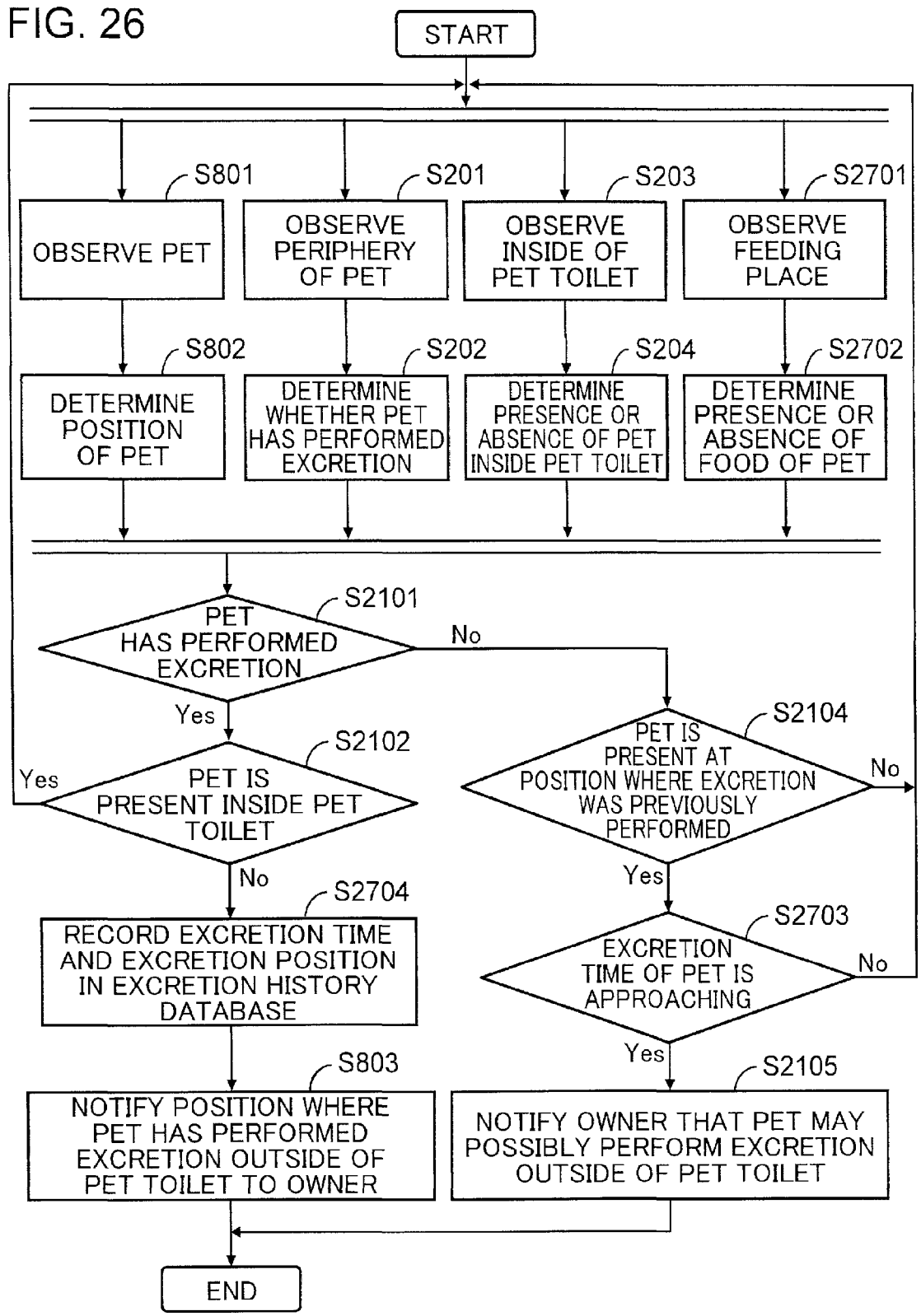
FIG. 26 is a flow chart showing overall processing by the excrement detection system according to the sixth embodiment.

FIG. 26 is a flow chart representing overall processing of the excrement detection system according to the sixth embodiment. Hereinafter, operations of the respective components in the breeding environment 2801 shown in FIG. 27 will be described in correspondence with the flow chart shown in FIG. 26.

Respective steps other than steps S2701 to S2704 are similar to the contents described in any of the first to fifth embodiments. Therefore, a detailed description thereof will be omitted.

In step S2701, the image sensor 2802 as the feeding place observing apparatus 2601 acquires an image of the feeding place 1601 that is an observation range of the image sensor 2802 at a predetermined observation cycle (for example, 1 second).

In step S2702, the feeding place information processing unit 2602 determines whether or not there is no more food in the feeding place 1601 based on an image acquired by the image sensor 2802. The feeding place information processing unit 2602 records the determination result in the feeding history database 2603.

In the example of the feeding history database 2603 shown in FIG. 28, the feeding place information processing unit 2602 determines that the dog 304 had finished eating at 10:43: 09 on Sep. 2, 2012 and at 11:03:24 on Sep. 3, 2012.

In step S2104, when the dog 304 is not present at a previous excretion position outside of the pet toilet 305 (No in step S2104), the processing advances to step S201, then to step S203, then to step S801, and then to step S2701. On the other hand, when the dog 304 is present at a previous excretion position outside of the pet toilet 305 (Yes in step S2104), the processing advances to step S2703.

In step S2703, the excretion predicting unit 2002 determines whether or not an excretion time of the dog 304 is approaching based on a previous excretion history of the dog 304 that is recorded in the excretion history database 2001 and a previous feeding history of the dog 304 that is recorded in the feeding history database 2603.

In the example of the excretion history database 2001 shown in FIG. 29, the excretion position determining unit 105 (or the excretion information processing unit 102) determines that the dog 304 had performed excretion at 12:00:09 on Sep. 2, 2012. Combined with the example of the feeding history database 2603 of the dog 304 shown in FIG. 28, it is shown that the dog 304 had performed excretion 1 hour and 17 minutes after 10:43:09 on Sep. 2, 2012, which is when the dog 304 had finished eating. Therefore, it is determined that excretion had been performed between 1 to 2 hours after feeding.

A feeding history and an excretion history prior to 10:00 on Sep. 2, 2012 are not shown in FIGS. 28 and 29. However, in this case, let us assume that a frequency of elapsed times from feeding to performing excretion is highest between 1 to 2 hours after feeding.

In this case, the excretion predicting unit 2002 determines that an excretion time of the dog 304 is approaching when 1 hour has elapsed from 11:03:24 on Sep. 3, 2012, which is the previous feeding time.

In step S2102, when the excretion position determining unit 105 determines that the dog 304 is not present in the pet toilet 305 (No in step S2102), the processing advances to step S2704. In step S2704, the excretion position determining unit 105 records the time and an excretion position at which the dog 304 had performed excretion in the excretion history database 2001.

In FIG. 26, steps S2701 and S2702 are repetitively executed at a predetermined observation cycle by the feeding place observing apparatus 2601 and the feeding place information processing unit 2602.

As described above, in the sixth embodiment, the excretion predicting unit 2002 determines that the pet is about to perform excretion when it is determined that an excretion time of a pet is approaching based on an elapsed time from a previous feeding time and that a position of the pet as calculated by the position information processing unit 702 approaches a previous excretion position outside of the pet toilet 305 as recorded in the excretion history database 2001. The notification control unit 106 notifies the prediction by the excretion predicting unit 2002 to the owner of the pet. Therefore, according to the sixth embodiment, the pet can be prevented from performing excretion outside of the pet toilet 305.

In step S2703 shown in FIG. 26, the excretion predicting unit 2002 determines whether or not an excretion time of the dog 304 is approaching based on a previous excretion history of the dog 304 that is recorded in the excretion history database 2001 and a previous feeding history of the dog 304 that is recorded in the feeding history database 2603. However, the determination method used by the excretion predicting unit 2002 is not limited to the above.

Alternatively, the excretion predicting unit 2002 may calculate an excretion cycle based on a history of excretion times that is recorded in the excretion history database 2001. In addition, the excretion predicting unit 2002 may determine that a next excretion time is approaching when an elapsed time from a previous excretion time approaches the calculated excretion cycle.

FIG. 30 is a diagram showing another example of the excretion history database 2001. The excretion position determining unit 105 records an excretion position in the excretion history database 2001 regardless of whether the excretion position is inside or outside the pet toilet 305.

In the example of the excretion history database 2001 shown in FIG. 30, the excretion position determining unit 105 determines that the dog 304 had performed excretion at 12:00:09 on Sep. 2, 2012 and at 18:00:51 on Sep. 3, 2012. At 12:00:09 on Sep. 2, 2012, the excretion position determining unit 105 determines that the dog 304 had performed excretion outside of the pet toilet 305 at coordinate (300, 500). In addition, at 18:00:51 on Sep. 3, 2012, the excretion position determining unit 105 determines that the dog 304 had performed excretion in the pet toilet 305 at coordinate (100, 100).

In the example of the excretion history database 2001 shown in FIG. 30, an excretion cycle is set to 30 hours from 12:00:09 on Sep. 2, 2012 to 18:00:51 on Sep. 3, 2012. An excretion history prior to 10:00 on Sep. 2, 2012 is not shown in FIG. 30. However, in this case, it is assumed that an average value of an excretion cycle as calculated by the excretion predicting unit 2002 is between 30 hours to 31 hours. As a result, the excretion predicting unit 2002 determines that a next excretion time is approaching as 0:00 on Sep. 5, 2012 which is 30 hours after 18:00 on Sep. 3, 2012 approaches.

The excrement detection system according to the present disclosure is capable of determining that a pet had performed excretion outside of a pet toilet when the pet is not present at the pet toilet upon performing excretion by detecting an excretion of the pet as well as a presence of the pet at the pet toilet. Accordingly, when the pet performs excretion outside of the pet toilet, an owner of the pet can be immediately notified to that effect. In addition, by immediately disposing excrement outside of the pet toilet, the owner of the pet can reduce adherence of an odor of the excrement. Therefore, the excrement detection system according to the present disclosure is particularly useful in a home where a pet is kept indoors, a cat cafe, a veterinary hospital, a pet shop, and the like.

This application is based on Japanese Patent application No. 2013-085616 filed in Japan Patent Office on Apr. 16, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An excrement detection system, comprising:
    an excretion information acquiring apparatus that acquires excretion information indicating whether or not excretion has been performed by a pet present in a living space;
    a toilet observing apparatus that observes inside of a pet toilet installed in the living space to acquire toilet information regarding the inside of the pet toilet;
    an excretion information processing unit that determines whether or not the pet has performed excretion based on the excretion information;
    a toilet information processing unit that determines whether or not the pet is present in the pet toilet based on the toilet information;
    an excretion position determining unit that determines that the pet has performed excretion outside of the pet toilet when the excretion information processing unit determines that the pet has performed excretion and the toilet information processing unit determines that the pet is not present in the pet toilet; and
    a notifying unit that notifies an owner of the pet that the pet has performed excretion outside of the pet toilet when the excretion position determining unit determines that the pet has performed excretion outside of the pet toilet.

2. The excrement detection system according to claim 1, further comprising:
- a pet observing apparatus that observes the pet to acquire pet information indicating a position of the pet; and
- a position information processing unit that determines a position of the pet in the living space based on the pet information, wherein
- when the excretion position determining unit determines that the pet has performed excretion outside of the pet toilet, the notifying unit notifies the owner of a position at which the pet has performed excretion based on the position of the pet as determined by the position information processing unit.

3. The excrement detection system according to claim 2, further comprising a position management database for recording history of a position of the pet, wherein
- the position information processing unit records the determined position of the pet as history of the position of the pet in the position management database, and
- the excretion information processing unit determines whether or not the pet has performed excretion based on the history of the position of the pet that is recorded in the position management database and on the excretion information.

4. The excrement detection system according to claim 2, further comprising a breeding environment database in which a position of an odor source in the living space is recorded, wherein
- the excretion information acquiring apparatus includes an odor sensor which is mounted to the pet and which detects an odor component around the pet, and
- the excretion information processing unit determines that the pet has performed excretion when the odor sensor has detected an odor component that differs from an odor component in the living space in a normal state that is free of excrement and, at the same time, when a position of the pet as determined by the position information processing unit is a position other than the position of the odor source that is recorded in the breeding environment database.

5. The excrement detection system according to claim 2, further comprising:
- an excretion history database for recording a position at which the pet had performed excretion outside of the pet toilet; and
- an excretion predicting unit that predicts that the pet may possibly perform excretion outside of the pet toilet when the position of the pet as determined by the position information processing unit is a position that is near a position at which the pet had performed excretion outside of the pet toilet and which is recorded in the excretion history database, wherein
- when determining that the pet has performed excretion outside of the pet toilet, the excretion position determining unit records a position of the pet as determined by the position information processing unit in the excretion history database, and
- when the excretion predicting unit predicts that the pet may possibly perform excretion outside of the pet toilet, the notifying unit notifies the owner that the pet may possibly perform excretion outside of the pet toilet.

6. The excrement detection system according to claim 5, wherein
- when the excretion information processing unit determines that the pet has performed excretion, the excretion position determining unit further records an excretion time at which the pet had performed excretion in the excretion history database,
- the excretion predicting unit calculates an excretion cycle of the pet based on the excretion time that is recorded in the excretion history database to predict a next excretion time of the pet based on the calculated excretion cycle, and
- the excretion predicting unit predicts that the pet may possibly perform excretion outside of the pet toilet when the position of the pet as determined by the position information processing unit is a position that is near a position at which the pet had performed excretion outside of the pet toilet and which is recorded in the excretion history database and, at the same time, when the predicted next excretion time of the pet approaches.

7. The excrement detection system according to claim 5, further comprising:
- a feeding place observing apparatus that observes a feeding place of the pet in the living space to acquire feeding place information that indicates presence or absence of food at the feeding place;
- a feeding history database for recording information related to food of the pet; and
- a feeding place information processing unit that determines whether or not the pet has eaten food based on the feeding place information and records a result of the determination and a feeding time at which the pet has eaten food in the feeding history database, wherein
- the excretion predicting unit calculates an elapsed time that is required from feeding to performing excretion of the pet based on the feeding time that is recorded in the feeding history database and the excretion time of the pet that is recorded in the excretion history database, to predict a next excretion time of the pet based on the calculated elapsed time, and
- the excretion predicting unit predicts that the pet may possibly perform excretion outside of the pet toilet when the position of the pet as determined by the position information processing unit is a position that is near a position at which the pet had performed excretion outside of the pet toilet and which is recorded in the excretion history database and, at the same time, when the predicted next excretion time of the pet approaches.

8. An excrement detection method of an excrement detection system that detects whether or not excretion has been performed by a pet, the excrement detection method comprising:
- acquiring excretion information indicating whether or not excretion has been performed by the pet present in a living space;
- observing inside of a pet toilet installed in the living space to acquire toilet information regarding the inside of the pet toilet;
- determining whether or not the pet has performed excretion based on the excretion information;
- determining whether or not the pet is present in the pet toilet based on the toilet information;
- determining that the pet has performed excretion outside of the pet toilet when it is determined that the pet has performed excretion and that the pet is not present in the pet toilet; and
- notifying an owner of the pet that the pet has performed excretion outside of the pet toilet when it is determined that the pet has performed excretion outside of the pet toilet.

9. A non-transitory computer readable recording medium storing a program that controls an excrement detection system that detects whether or not excretion has been performed by a pet, the program causing a computer of the excrement detection system to:
- acquire excretion information indicating whether or not excretion has been performed by the pet present in a living space;
- acquire toilet information regarding inside of a pet toilet installed in the living space;
- determine whether or not the pet has performed excretion based on the excretion information;
- determine whether or not the pet is present in the pet toilet based on the toilet information;
- determine that the pet has performed excretion outside of the pet toilet when it is determined that the pet has performed excretion and that the pet is not present in the pet toilet; and
- notify an owner of the pet that the pet has performed excretion outside of the pet toilet when it is determined that the pet has performed excretion outside of the pet toilet.

* * * * *